(12) United States Patent
Yamamoto et al.

(10) Patent No.: US 9,586,834 B2
(45) Date of Patent: Mar. 7, 2017

(54) POSITIVE ELECTRODE ACTIVE SUBSTANCE PARTICLES AND PROCESS FOR PRODUCING THE SAME, AND NON-AQUEOUS ELECTROLYTE SECONDARY BATTERY

(75) Inventors: Manabu Yamamoto, Yamaguchi-ken (JP); Daisuke Nishikawa, Yamaguchi-ken (JP); Kouta Sano, Fukuoka-ken (JP); Osamu Sasaki, Yamaguchi-ken (JP); Hideaki Sadamura, Yamaguchi-ken (JP)

(73) Assignee: TODA KOGYO CORPORATION, Hiroshima (JP)

( * ) Notice: Subject to any disclaimer, the term of this patent is extended or adjusted under 35 U.S.C. 154(b) by 396 days.

(21) Appl. No.: 14/007,430

(22) PCT Filed: Mar. 22, 2012

(86) PCT No.: PCT/JP2012/057353
§ 371 (c)(1),
(2), (4) Date: Oct. 18, 2013

(87) PCT Pub. No.: WO2012/133113
PCT Pub. Date: Oct. 4, 2012

(65) Prior Publication Data
US 2014/0045068 A1    Feb. 13, 2014

(30) Foreign Application Priority Data
Mar. 30, 2011    (JP) .................................. 2011-076581

(51) Int. Cl.
*H01M 4/48*    (2010.01)
*H01M 4/50*    (2010.01)
(Continued)

(52) U.S. Cl.
CPC .............. *C01D 15/02* (2013.01); *C01G 53/50* (2013.01); *H01M 4/505* (2013.01); *H01M 4/525* (2013.01);
(Continued)

(58) Field of Classification Search
CPC ........ H01M 4/505; H01M 4/525; C01G 53/50
See application file for complete search history.

(56) References Cited

U.S. PATENT DOCUMENTS

2004/0234857 A1*  11/2004  Shiozaki et al. ........... 429/231.3
2006/0057466 A1*   3/2006  Suhara et al. ................ 429/322
(Continued)

FOREIGN PATENT DOCUMENTS

EP    2 485 305 A1    8/2012
JP    09-055211        2/1997
(Continued)

OTHER PUBLICATIONS

Extended European Search Report issued in European Patent Application No. 12763014.3 dated Dec. 15, 2014.

*Primary Examiner* — Kenneth Douyette
(74) *Attorney, Agent, or Firm* — Nixon & Vanderhye P.C.

(57) ABSTRACT

The present invention provides positive electrode active substance particles which are improved in charge/discharge capacities, cycle characteristics and thermal stability. The positive electrode active substance particles according to the present invention comprise a compound having at least a crystal system belonging to a space group of R-3m and a crystal system belonging to a space group of C2/m and having a specific peak intensity ratio, in which a content of Mn in the compound is controlled such that a molar ratio of Mn/(Ni+Co+Mn) therein is not less than 0.55; a content of boron in the compound is 0.01 to 1% by weight; a content of fluorine in the compound is 0.01 to 5% by weight; and a content of an element A (at least one element selected from the group consisting of Al, Mg, Ti, Zr, Ca, Fe, Zn, Mo and
(Continued)

Bi) in the compound is 0.004 to 9% by weight, and can be produced by calcining a mixture comprising precursor particles comprising Mn and Ni and/or Co, a lithium compound, a boron compound, a fluorine compound and a compound of the element A.

17 Claims, 2 Drawing Sheets

(51) Int. Cl.
    *H01M 4/52*     (2010.01)
    *C01D 15/02*     (2006.01)
    *C01G 53/00*     (2006.01)
    *H01M 4/505*     (2010.01)
    *H01M 4/525*     (2010.01)

(52) U.S. Cl.
    CPC ...... *C01P 2002/52* (2013.01); *C01P 2002/72* (2013.01); *C01P 2002/74* (2013.01); *Y02E 60/122* (2013.01); *Y02P 70/54* (2015.11)

(56) References Cited

U.S. PATENT DOCUMENTS

| | | |
|---|---|---|
| 2007/0160906 A1 | 7/2007 | Tooyama et al. |
| 2009/0280412 A1* | 11/2009 | Imanari et al. ............... 429/221 |
| 2011/0003200 A1 | 1/2011 | Shizuka et al. |
| 2011/0200880 A1 | 8/2011 | Yu |
| 2012/0217435 A1 | 8/2012 | Yamamoto et al. |

FOREIGN PATENT DOCUMENTS

| | | |
|---|---|---|
| JP | 9-55211 | 2/1997 |
| JP | 2006-331943 | 12/2006 |
| JP | 2007-48711 | 2/2007 |
| JP | 2008-270201 | 11/2008 |
| JP | 2011-96650 | 5/2011 |
| JP | 2011-134708 | 7/2011 |
| JP | 2011-171113 | 9/2011 |
| WO | WO 2008/078695 | 7/2008 |

* cited by examiner

POSITIVE ELECTRODE ACTIVE SUBSTANCE PARTICLES AND PROCESS FOR PRODUCING THE SAME, AND NON-AQUEOUS ELECTROLYTE SECONDARY BATTERY

This application is the U.S. national phase of International Application No. PCT/JP2012/057353 filed 22 Mar. 2012 which designated the U.S. and claims priority to JP 2011-076581 filed 30 Mar. 2011, the entire contents of each of which are hereby incorporated by reference.

TECHNICAL FIELD

This invention is based on Japanese Patent Application No. 2011-76581 to which Article 19 of the Industrial Technology Enhancement Act is applied, as a patent application pertaining to the result of research entrusted by Japanese national government or the like (research in the project named "Development of technology of high-performance storage system for next-generation vehicles/development of technology of elements/research and development of positive electrode active materials for high-output lithium ion batteries by design of particles having a multilayer structure" entrusted by the New Energy and Industrial Technology Development Organization in fiscal year 2009).

The present invention relates to positive electrode (cathode) active substance particles for non-aqueous electrolyte secondary batteries which exhibit large charge/discharge capacities and are excellent in cycle characteristics and thermal stability.

BACKGROUND ART

With the recent rapid development of portable and cordless electronic devices such as audio-visual (AV) devices and personal computers, there is an increasing demand for secondary batteries having a small size, a light weight and a high energy density as a power source for driving these electronic devices. Also, in consideration of global environments, electric cars and hybrid cars have been recently developed and put into practice, so that there is an increasing demand for lithium ion secondary batteries used in large size applications which have excellent storage characteristics. Under these circumstances, the lithium ion secondary batteries having advantages such as large charge/discharge capacities have been noticed.

Hitherto, as positive electrode active substances useful for high energy-type lithium ion secondary batteries exhibiting a 4 V-grade voltage, there are generally known $LiMn_2O_4$ having a spinel structure, $LiMnO_2$ having a zigzag layer structure, $LiCoO_2$ and $LiNiO_2$ having a layer rock-salt structure, or the like. Among the secondary batteries using these active substances, lithium ion secondary batteries using $LiNiO_2$ have been noticed because of large charge/discharge capacities thereof. However, these materials tend to be deteriorated in thermal stability upon charging and charge/discharge cycle durability, and, therefore, it has been required to further improve properties thereof.

Specifically, when lithium is released from $LiNiO_2$, the crystal structure of $LiNiO_2$ suffers from Jahn-Teller distortion since $Ni^{3+}$ is converted into $Ni^{4+}$. When the amount of Li released reaches 0.45, the crystal structure of such a lithium-released region of $LiNiO_2$ is transformed from a hexagonal system into a monoclinic system, and a further release of lithium therefrom causes transformation of the crystal structure from a monoclinic system into a hexagonal system. Therefore, when the charge/discharge reaction is repeated, the crystal structure of $LiNiO_2$ tends to become unstable, so that the resulting secondary batteries tend to be deteriorated in cycle characteristics or suffer from occurrence of undesired reaction between $LiNiO_2$ and an electrolyte solution owing to release of oxygen therefrom, resulting in deterioration in thermal stability and storage characteristics of the secondary batteries. To solve these problems, various studies have been made on materials to which Co and Al to are added by substituting a part of Ni in $LiNiO_2$ therewith. However, these materials have still failed to solve the above-described conventional problems. Therefore, it has still been required to provide a composite oxide having a higher stability.

Hitherto, in order to improve various properties of $LiNiO_2$ particles such as stability of a crystal structure, charge/discharge cycle characteristics and thermal stability, various methods have been attempted. For example, there are known the technique in which the surface of $LiNiAlO_2$ is coated with an Li—Ni—Co—Mn composite oxide to improve cycle characteristics thereof (Patent Document 1); the technique in which different kinds of materials, i.e., an Li—Co composite oxide and an Li—Ni—Co—Mn composite oxide are mixed with each other to improve charge/discharge cycle characteristics of the Li—Co composite oxide (Patent Document 2); the technique in which lithium carbonate, $Ni(OH)_2$, $Co(OH)_2$ and manganese carbonate are suspended in an Li—Co composite oxide, or the Li—Co composite oxide is mechanically treated and coated with an Li—Ni—Co—Mn composite oxide, to improve charge/discharge cycle characteristics of the Li—Co composite oxide (Patent Document 3 and Patent Document 4); the technique for improving a crystallinity or a thermal stability of composite oxide particles by coating the particles with a fluorine compound (Patent Documents 7 and 8); and the like. However, these conventional techniques have been still insufficient to improve the properties of the positive electrode active substance particles.

In recent years, it has been found that a positive electrode active substance comprising $Li_2MnO_3$ belonging to a space group of C2/m and having a higher capacity exhibits large charge/discharge capacities. However, it is known that a secondary battery produced using such a positive electrode active substance must be charged at a high potential, and therefore tends to have fatal disadvantages, i.e., tends to be deteriorated in cycle characteristics (Patent Document 5). There has been reported the technique using the above positive electrode active substance which is improved in cycle characteristics. However, the technique tends to be still insufficient in improvement of the cycle characteristics (Patent Document 6).

In addition, from the reasons as described above, as the voltage at which a battery is subjected to charging is increased, there occurs such a tendency that a positive electrode active substance used in the battery becomes more unstable owing to accelerated oxidation of a transition metal contained therein. The positive electrode active substance comprising $Li_2MnO_3$ belonging to a space group of C2/m is to be subjected to charging at a high voltage, and therefore is required to have a higher thermal stability.

CITATION LIST

Patent Literatures

Patent Document 1: Japanese Patent Application Laid-open (KOKAI) No. 2004-127694
Patent Document 2: Japanese Patent Application Laid-open (KOKAI) No. 2005-317499
Patent Document 3: Japanese Patent Application Laid-open (KOKAI) No. 2006-331943
Patent Document 4: Japanese Patent Application Laid-open (KOKAI) No. 2007-48711
Patent Document 5: Japanese Patent Application Laid-open (KOKAI) No. 9-55211
Patent Document 6: Japanese Patent Application Laid-open (KOKAI) No. 2008-270201
Patent Document 7: Japanese Patent Application Laid-open (TOKUHYO) No. 2008-536285
Patent Document 8: Japanese Patent Application Laid-open (TOKUKAI) No. 2010-232001

SUMMARY OF THE INVENTION

Problem to be Solved by the Invention

At present, it has been strongly required to provide a positive electrode active substance for non-aqueous electrolyte secondary batteries which is excellent in charge/discharge capacities, cycle characteristics and thermal stability. However, the positive electrode active substance capable of fully satisfying the above requirements has not been obtained until now.

In particular, in the application field of electric vehicles, there is a strong demand for secondary batteries having a light weight, a large capacity and a high safety.

In consequence, an object of the present invention is to provide positive electrode active substance particles for non-aqueous electrolyte secondary batteries which have large charge/discharge capacities, excellent cycle characteristics and a high thermal stability, a process for producing the positive electrode active substance particles, and a non-aqueous electrolyte secondary battery comprising a positive electrode comprising the positive electrode active substance particles.

Means for Solving the Problem

That is, according to the present invention, there are provided positive electrode active substance particles comprising a compound having at least a crystal system belonging to a space group of R-3m and a crystal system belonging to a space group of C2/m, the compound comprising a composite oxide comprising at least Li, Mn, and Co and/or Ni, an element A (at least one element selected from the group consisting of Al, Mg, Ti, Zr, Ca, Fe, Zn, Mo and Bi), boron and fluorine, in which a content of Mn in the compound is controlled such that a molar ratio of Mn to a sum of Ni, Co and Mn [Mn/(Ni+Co+Mn)] therein is not less than 0.55; a content of the boron in the compound is 0.01 to 1% by weight; a content of the fluorine in the compound is 0.01 to 5% by weight; a content of the element A in the compound is 0.004 to 9% by weight; and a relative intensity ratio of a maximum diffraction peak intensity (a) observed at $2\theta=20.8\pm1°$ in a powder X-ray diffraction pattern of the positive electrode active substance particles as measured using a Cu—K$\alpha$ ray to a maximum diffraction peak intensity (b) observed at $2\theta=18.6\pm1°$ in the powder X-ray diffraction pattern [(a)/(b)] is 0.02 to 0.2 (Invention 1).

Also, according to the present invention, there are provided the positive electrode active substance particles as described in the above Invention 1, wherein the positive electrode active substance particles comprise $LiM_xMn_{1-x}O_2$ wherein M is Ni and/or Co; $0<x\leq1$, as a compound having a crystal system belonging to a space group of R-3m, and $Li_2M'_{(1-y)}Mn_yO_3$ wherein M' is Ni and/or Co; $0<y\leq1$, as a compound having a crystal system belonging to a space group of C2/m (Invention 2).

Also, according to the present invention, there are provided the positive electrode active substance particles as described in the above Invention 1 or 2, wherein the positive electrode active substance particles have a molar ratio of Li/(Ni+Co+Mn) of 1.2 to 1.7 (Invention 3).

Also, according to the present invention, there are provided the positive electrode active substance particles as described in any one of the above Inventions 1 to 3, wherein the positive electrode active substance particles have a specific surface area of 0.05 to 20 m$^2$/g as measured by a BET method (Invention 4).

Also, according to the present invention, there are provided the positive electrode active substance particles as described in any one of the above Inventions 1 to 4, wherein the positive electrode active substance particles are in the form of secondary particles produced by aggregating primary particles thereof in which the primary particles have an average primary particle diameter of not more than 5 μm, and the secondary particles have an average secondary particle diameter of 1 to 50 μm (Invention 5).

In addition, according to the present invention, there is provided a process for producing the positive electrode active substance particles as described in any one of the above Inventions 1 to 5, comprising any of a step (1) of dry-mixing precursor particles comprising a transition metal, a boron compound, a lithium compound, a fluorine compound and a compound of the element A and then calcining the resulting mixture; a step (2) of wet-mixing a slurry or the like of the precursor particles comprising a transition metal with the boron compound, the fluorine compound and the compound of the element A, drying the obtained wet mixture to obtain dry particles, mixing the dry particles with the lithium compound, and then calcining the resulting mixture; and a step (3) of dry-mixing or wet-mixing the precursor particles comprising a transition metal with the boron compound and the lithium compound, calcining particles of the obtained dry or wet mixture, drymixing or wet-mixing the calcined product with the fluorine compound and the compound of the element A, and subjecting particles of the resulting mixture to heat treatment (Invention 6).

Further, according to the present invention, there is provided a non-aqueous electrolyte secondary battery comprising a positive electrode comprising the positive electrode active substance particles as described in any one of the above Inventions 1 to 5 (Invention 7).

Effect of the Invention

The positive electrode active substance particles according to the present invention can exhibit large charge/discharge capacities and can be improved in cycle characteristics and thermal stability, and therefore can be suitably used as positive electrode active substance particles for non-aqueous electrolyte secondary batteries.

PREFERRED EMBODIMENTS FOR CARRYING OUT THE INVENTION

Figure 1:
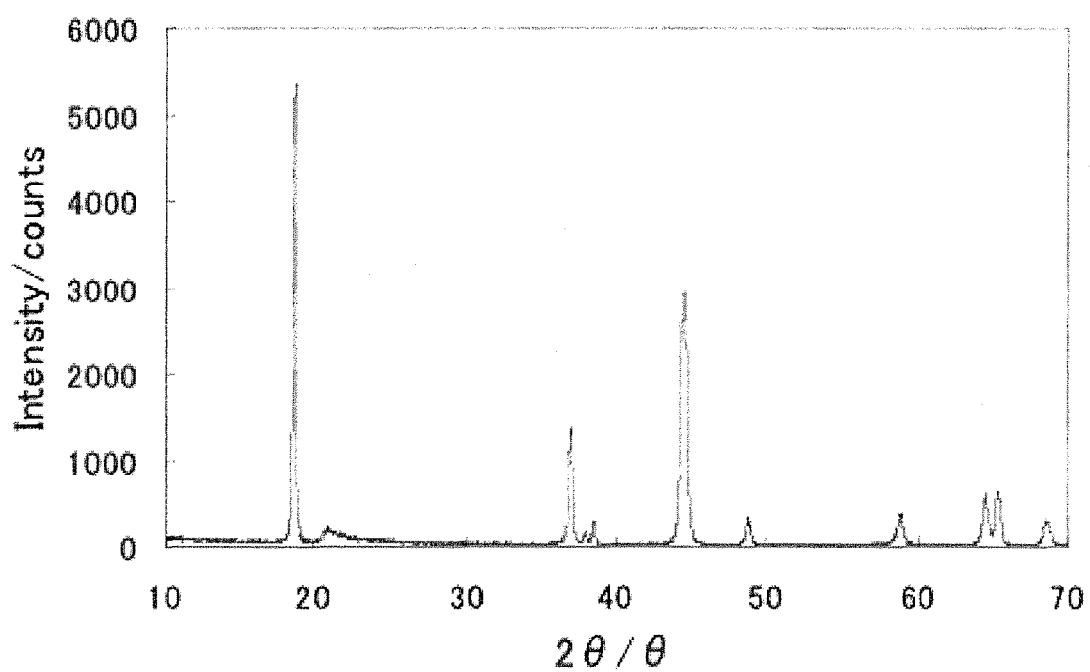
FIG. 1 is an X-ray diffraction pattern of positive electrode active substance particles obtained in Example 3.

The construction of the present invention is described in more detail below.

The positive electrode active substance particles according to the present invention comprise a compound having at least a crystal system belonging to a space group of R-3m and a crystal system belonging to a space group of C2/m, and are in the form of a compound which comprises a composite oxide comprising at least Li, Mn, and Co and/or Ni, an element A (at least one element selected from the group consisting of Al, Mg, Ti, Zr, Ca, Fe, Zn, Mo and Bi), boron and fluorine. Meanwhile, the substance comprising a composite oxide comprising at least Li, Mn, and Co and/or Ni, an element A (at least one element selected from the group consisting of Al, Mg, Ti, Zr, Ca, Fe, Zn, Mo and Bi), boron and fluorine may be obtained by mixing transition metal-containing precursor particles previously prepared, a boron compound, a lithium compound, a fluorine compound and a compound of the element A with each other by various methods, and then subjecting the resulting mixture to calcination or heat treatment. Therefore, the above substance is not necessarily a substance in which the respective elements are uniformly dispersed therein. In the present invention, for the sake of convenience, such a substance may be hereinafter occasionally referred to as a "compound". Also, the calcined mixture (i.e., the compound) is in the form of particles, and therefore may occasionally mean the positive electrode active substance particles themselves.

The compound having a crystal system belonging to a space group of R-3m preferably includes those compounds represented by the formula: $LiM_xMn_{1-x}O_2$ wherein M is Ni and/or Co; $0<x\leq 1$. Specific examples of the preferred $LiM_xMn_{1-x}O_2$ include $LiCo_xMn_{1-x}O_2$, $LiNi_xMn_{1-x}O_2$, and $Li(Ni, Co)_xMn_{1-x}O_2$.

Meanwhile, the numerical character "3" of the above space group of "R-3 m" is actually indicated with a "macron" as "$\bar{3}$", but the symbol of the space group is conveniently expressed herein merely by "R-3 m".

The compound having a crystal system belonging to a space group of C2/m preferably includes those compounds represented by the formula: $Li_2M'_{(1-y)}Mn_yO_3$ wherein M' is Ni and/or Co; $0<y\leq 1$.

When the positive electrode active substance particles (compound) according to the present invention are subjected to a powder X-ray diffraction analysis using a Cu—Kα ray as a radiation source, one peak inherent to $LiM_xMn_{1-x}O_2$ as the compound having a crystal system belonging to a space group of R-3m is observed at $2\theta=18.6\pm1°$ in the powder diffraction pattern, whereas another peak inherent to $Li_2M'_{(1-y)}Mn_yO_3$ as the compound having a crystal system belonging to a space group of C2/m is observed at $2\theta=20.8\pm1°$ in the powder diffraction pattern.

In the positive electrode active substance particles (compound) according to the present invention, the relative intensity ratio of a maximum diffraction peak intensity (a) observed at $2\theta=20.8\pm1°$ in the powder X-ray diffraction pattern to a maximum diffraction peak intensity (b) observed at $2\theta=18.6\pm1°$ in the powder X-ray diffraction pattern [(a)/(b)] is 0.02 to 0.2. When the relative intensity ratio [(a)/(b)] is less than 0.02, the resulting positive electrode active substance particles tend to hardly exhibit sufficient charge/discharge capacities owing to an excessively small amount of the compound having a crystal system belonging to a space group of C2/m. When the relative intensity ratio [(a)/(b)] is more than 0.2, lithium ions in the resulting positive electrode active substance particles tend to be hardly moved smoothly owing to an excessively large amount of the compound having a crystal system belonging to a space group of C2/m, so that the positive electrode active substance particles tend to hardly exhibit sufficient charge/discharge capacities. The relative intensity ratio [(a)/(b)] is preferably 0.02 to 0.15, more preferably 0.02 to 0.12 and still more preferably 0.025 to 0.08.

In the positive electrode active substance particles (compound) according to the present invention, the molar ratio of Li to a sum of Ni, Co and Mn [Li/(Ni+Co+Mn)] therein is preferably 1.2 to 1.7. When the molar ratio of Li/(Ni+Co+Mn) is less than 1.2, the resulting positive electrode active substance particles tend to be deteriorated in charge capacity owing to a less amount of lithium therein contributing to charging. When the molar ratio of Li/(Ni+Co+Mn) is more than 1.7, the resulting positive electrode active substance particles tend to be contrarily deteriorated in discharge capacity owing to an excessively large amount of lithium therein. The molar ratio of Li/(Ni+Co+Mn) in the positive electrode active substance particles is more preferably 1.25 to 1.65 and still more preferably 1.3 to 1.6.

In the positive electrode active substance particles (compound) according to the present invention, the content of Mn therein is controlled such that a molar ratio of Mn to a sum of Ni, Co and Mn [Mn/(Ni+Co+Mn)] therein is not less than 0.55. When the molar ratio of Mn/(Ni+Co+Mn) is less than 0.55, the compound having a crystal system belonging to a space group of C2/m tends to be formed in a sufficient amount, so that the resulting positive electrode active substance particles tend to be deteriorated in charge/discharge capacities. The molar ratio of Mn/(Ni+Co+Mn) in the positive electrode active substance particles is preferably not less than 0.56, more preferably not less than 0.6 and still more preferably not less than 0.65. The upper limit of the molar ratio of Mn/(Ni+Co+Mn) is preferably about 0.95.

In the positive electrode active substance particles (compound) according to the present invention, the content of Ni therein is controlled such that a molar ratio of Ni to a sum of Ni, Co and Mn [Ni/(Ni+Co+Mn)] is preferably 0 to 0.45. When the molar ratio of Ni/(Ni+Co+Mn) is more than 0.45, the resulting positive electrode active substance particles tend to be deteriorated in thermal stability. The Ni content (molar ratio of Ni/(Ni+Co+Mn)) in the positive electrode active substance particles is more preferably 0 to 0.4 and still more preferably 0 to 0.35.

In the positive electrode active substance particles (compound) according to the present invention, the content of Co therein is controlled such that a molar ratio of Co to a sum of Ni, Co and Mn [Co/(Ni+Co+Mn)] therein is preferably 0 to 0.45. When the molar ratio of Co/(Ni+Co+Mn) is more than 0.45, the resulting positive electrode active substance particles tend to be deteriorated in stability of their structure. The Co content (molar ratio of Co/(Ni+Co+Mn)) in the positive electrode active substance particles is more preferably 0 to 0.4 and still more preferably 0 to 0.35.

The positive electrode active substance particles (compound) according to the present invention comprise boron in an amount of 0.01 to 1% by weight. When the content of boron in the positive electrode active substance particles is less than 0.01% by weight, the secondary battery produced using the resulting positive electrode active substance particles tends to be hardly improved in cycle characteristics and thermal stability. When the content of boron in the positive electrode active substance particles is more than 1% by weight, the resulting positive electrode active substance particles tend to be deteriorated in charge/discharge capacities. The content of boron in the positive electrode active substance particles is preferably 0.012 to 0.8% by weight, more preferably 0.015 to 0.5% by weight and still more preferably 0.02 to 0.3% by weight.

The positive electrode active substance particles (compound) according to the present invention comprise fluorine in an amount of 0.01 to 5% by weight. When the content of fluorine in the positive electrode active substance particles is less than 0.01% by weight, the secondary battery produced using the resulting positive electrode active substance particles tends to be hardly improved in cycle characteristics and thermal stability. When the content of fluorine in the positive electrode active substance particles is more than 5% by weight, the resulting positive electrode active substance particles tend to be deteriorated in charge/discharge capacities. The content of fluorine in the positive electrode active substance particles is preferably 0.02 to 4% by weight, more preferably 0.03 to 3% by weight and still more preferably 0.04 to 2% by weight.

The positive electrode active substance particles (compound) according to the present invention comprise the element A (at least one element selected from the group consisting of Al, Mg, Ti, Zr, Ca, Fe, Zn, Mo and Bi) in an amount of 0.004 to 9% by weight. When the content of the element A in the positive electrode active substance particles is less than 0.004% by weight, the secondary battery produced using the resulting positive electrode active substance particles tends to be hardly improved in cycle characteristics and thermal stability. When the content of the element A in the positive electrode active substance particles is more than 9% by weight, the resulting positive electrode active substance particles tend to be deteriorated in charge/discharge capacities. The content of the element A in the positive electrode active substance particles is preferably 0.01 to 5% by weight, more preferably 0.02 to 3% by weight and still more preferably 0.02 to 1.5% by weight.

The specific surface area of the positive electrode active substance particles according to the present invention as measured by a BET method is preferably 0.05 to 20 $m^2/g$, more preferably 0.15 to 10 $m^2/g$ and still more preferably 0.3 to 6 $m^2/g$.

The positive electrode active substance particles according to the present invention are in the form of secondary particles produced by aggregating primary particles thereof. The average primary particle diameter of the positive electrode active substance particles is preferably not more than 5 μm, more preferably 0.005 to 2 μm and still more preferably 0.01 to 0.8 μm.

The average secondary particle diameter of the positive electrode active substance particles according to the present invention is preferably 1 to 50 μm. When the average secondary particle diameter of the positive electrode active substance particles is less than 1 μm, the resulting positive electrode active substance particles tend to exhibit an excessively high reactivity with an electrolyte solution owing to excessive increase in contact area with the electrolyte solution, and therefore tend to be deteriorated in stability upon charging. When the average secondary particle diameter of the positive electrode active substance particles is more than 50 μm, the resulting positive electrode tends to exhibit an increased internal resistance and therefore tends to be deteriorated in charge/discharge rate characteristics. The average secondary particle diameter of the positive electrode active substance particles is more preferably 2 to 30 μm and still more preferably 3 to 20 μm.

Next, the process for producing the positive electrode active substance particles (compound) according to the present invention is described.

The positive electrode active substance particles (compound) according to the present invention may be produced by mixing previously prepared transition metal-containing precursor particles with a boron compound, a lithium compound, a fluorine compound and a compound of the element A, and then calcining the resulting mixture.

The above transition metal-containing precursor particles used in the present invention may be produced by supplying a mixed solution comprising a nickel salt, a cobalt salt and a manganese salt at desired concentrations and an aqueous alkali solution into a reaction vessel, controlling a pH value of the resulting suspension to 7.5 to 13, circulating the overflowed suspension through a concentration vessel connected to an overflow pipe into the reaction vessel while controlling a concentration velocity of the suspension in the concentration vessel, and then reacting the respective components until a concentration of the precursor particles in the suspension in the reaction vessel and a precipitation vessel reaches 0.2 to 15 mol/L. Alternatively, the precursor particles may also be obtained from the overflowed suspension without using the concentration vessel. After completion of the reaction, the resulting product may be subjected to water-washing, drying and pulverization by ordinary methods.

The transition metal-containing precursor particles used in the present invention are not particularly limited, and various transition metal compounds may be used in the present invention. Examples of the transition metal-containing precursor particles include particles of oxides, hydroxides and carbonates of transition metals as well as mixtures thereof. Among these precursor particles, preferred are particles of hydroxides or carbonates of transition metals.

The precursor particles used in the present invention preferably have an average particle diameter of 1 to 50 μm and a BET specific surface area of 0.5 to 300 $m^2/g$.

The boron compound used in the present invention is not particularly limited, and various boron compounds may be used in the present invention. Examples of the boron compound include diboron trioxide, boric acid (orthoboric acid), metaboric acid, tetraboric acid, and various borates such as lithium borate. Among these boron compounds, preferred is boric acid. The boron compound may be compounded with the precursor particles in an amount of 0.02 to 10% by weight based on the weight of the above precursor particles.

The lithium compound used in the present invention is not particularly limited, and various lithium salts may be used in the present invention. Examples of the lithium compound include lithium hydroxide monohydrate, lithium nitrate, lithium carbonate, lithium acetate, lithium bromide, lithium chloride, lithium citrate, lithium fluoride, lithium iodide, lithium lactate, lithium oxalate, lithium phosphate, lithium pyruvate, lithium sulfate and lithium oxide. Among these lithium compounds, preferred is lithium carbonate. The lithium compound may be compounded with the precursor particles in an amount of 20 to 100% by weight based on the weight of the precursor particles.

The fluorine compound used in the present invention is not particularly limited, and various fluorine compounds may be used in the present invention. Examples of the fluorine compound include lithium fluoride, aluminum fluoride, magnesium fluoride, ammonium fluoride, sodium fluoroacetate and allyl fluoride. Among these fluorine compounds, preferred are ammonium fluoride and aluminum fluoride. The fluorine compound may be compounded with the precursor particles in an amount of 0.01 to 20% by weight based on the weight of the precursor particles.

The compound of the element A used in the present invention is not particularly limited, and various oxides, hydroxides, carbonates, sulfates, nitrates, hydrochlorides and oxalates of Al, Mg, Ti, Zr, Ca, Fe, Zn, Mo and Bi as well as alkoxides or the like of these elements may be used in the present invention. Examples of the aluminum compound as the compound of the element A include aluminum sulfate, aluminum nitrate, sodium aluminate and aluminum fluoride. The compound of the element A may be compounded with the precursor particles in an amount of 0.005 to 40% by weight based on the weight of the precursor particles.

Also, as a single compound functioning both of the fluorine compound and the compound of the element A, there may be used a fluorine compound of the element A, whereby both the elements may be added at the same time. The fluorine compound of the element A may be compounded with the precursor particles in an amount of 0.015 to 23% by weight based on the weight of the precursor particles.

In addition, the lithium compound used in the present invention preferably has an average particle diameter of not more than 50 µm and more preferably not more than 30 µm. When the average particle diameter of the lithium compound is more than 50 µm, the lithium compound tends to be hardly uniformly mixed with the precursor particles, so that it may be difficult to obtain composite oxide particles having a good crystallinity.

The mixing treatment of the transition metal-containing precursor particles with the boron compound, the lithium compound, the fluorine compound and the compound of the element A may be conducted by either a dry method or a wet method as long as they may be uniformly mixed with each other.

The mixing treatment of the transition metal-containing precursor particles with the respective compounds may be conducted at one time. Alternatively, the transition metal-containing precursor particles may be first mixed with one or more specific compounds among these compounds, followed by calcining the obtained mixture, and the resulting calcined product may be mixed with the remaining one or more compounds.

As the process for producing the positive electrode active substance particles according to the present invention, there may be mentioned a process including the step of dry-mixing the transition metal-containing precursor particles, the boron compound, the lithium compound, the fluorine compound and the compound of the element A and then calcining the resulting mixture or a process including the step of wet-mixing a slurry or the like of the transition metal-containing precursor particles with the boron compound, the fluorine compound and the compound of the element A, drying the obtained wet mixture to obtain dry particles, mixing the dry particles with the lithium compound, and then calcining the resulting mixture.

The calcination temperature used in the production processes is preferably 500 to 1500° C. When the calcination temperature is less than 500° C., the reaction of Li with Ni, Co and Mn may fail to proceed sufficiently, so that these elements tend to be hardly formed into a composite material thereof. When the calcination temperature is more than 1500° C., sintering tends to excessively proceed. The calcination temperature is more preferably 700 to 1200° C. and still more preferably 800 to 1050° C. The atmosphere upon the calcination is preferably an oxidative gas atmosphere, and more preferably ordinary atmospheric air. The calcination time is preferably 1 to 30 hr.

In addition, as the process for producing the positive electrode active substance particles according to the present invention, there may also be mentioned a process including the step of dry-mixing or wet-mixing the transition metal-containing precursor particles with the boron compound and the lithium compound, calcining particles of the obtained dry or wet mixture, dry-mixing or wet-mixing the calcined product with the fluorine compound and the compound of the element A, and subjecting particles of the resulting mixture to heat treatment.

The calcination temperature used in the above production process is preferably 500 to 1500° C. When the calcination temperature is less than 500° C., the reaction of Li with Ni, Co and Mn may fail to proceed sufficiently, so that these elements tend to be hardly formed into a composite material thereof. When the calcination temperature is more than 1500° C., sintering tends to excessively proceed. The calcination temperature is more preferably 700 to 1200° C. and still more preferably 800 to 1050° C. The atmosphere upon the calcination is preferably an oxidative gas atmosphere, and more preferably ordinary atmospheric air. The calcination time is preferably 1 to 30 hr.

The heat treatment temperature is preferably 100 to 1100° C., more preferably 200 to 900° C. and still more preferably 300 to 500° C. The atmosphere upon the heat treatment is preferably an oxidative gas atmosphere, and more preferably ordinary atmospheric air. The heat treatment time is preferably 1 to 30 hr.

In the present invention, it is essentially required that the resulting positive electrode active substance particles comprise a compound comprising at least a crystal system belonging to a space group of R-3m and a crystal system belonging to a space group of C2/m at specific proportions. In order to allow the compound obtained by the calcination to comprise the above two kinds of crystal systems in specific proportions, it may be basically required to prepare the precursor particles whose Mn content is controlled such that the molar ratio of Mn/(Ni+Co+Mn) therein is not less than 0.55 and preferably 0.55 to 0.95. As the method of controlling the molar ratio of Mn/(Ni+Co+Mn) in the precursor particles to the above range, there may be used the method of controlling amounts of the nickel salt, cobalt salt and manganese salt as the raw materials, the method of controlling a pH value of the reaction solution, the method of controlling an amount of a complexing agent such as ammonia, or the like. Meanwhile, the crystal system belonging to a space group of R-3m is derived from the above compound of $LiM_xMn_{1-x}O_2$ whereas the crystal system belonging to a space group of C2/m is derived from the above compound $Li_2M'_{(1-y)}Mn_yO_3$. These compounds are produced at the same time through a series of the production steps, and the proportions therebetween may be basically determined according to the Li and Mn contents in the precursor particles as described above.

In the method of controlling a pH value of the reaction solution, when the pH value of the reaction solution is lowered, there is such a tendency that the peak intensity ratio [(a)/(b)] is decreased, i.e., the amount of $Li_2M'_{(1-y)}Mn_yO_3$ having a crystal system belonging to a space group of C2/m is reduced. On the contrary, when the pH value of the reaction solution is raised, there is such a tendency that the peak intensity ratio [(a)/(b)] is increased, i.e., the amount of $Li_2M'_{(1-y)}Mn_yO_3$ having a crystal system belonging to a space group of C2/m is increased.

In the method of controlling an amount of the complexing agent added to the reaction solution, when the amount of the complexing agent added to the reaction solution is reduced, there is such a tendency that the peak intensity ratio [(a)/(b)] is decreased, i.e., the amount of $Li_2M'_{(1-y)}Mn_yO_3$ having a crystal system belonging to a space group of C2/m is reduced. On the contrary, when the amount of the complexing agent added to the reaction solution is increased, there is such a tendency that the peak intensity ratio [(a)/(b)] is increased, i.e., the amount of $Li_2M'_{(1-y)}Mn_yO_3$ having a crystal system belonging to a space group of C2/m is increased.

As the complexing agent, there may be used one or more compounds selected from the group consisting of ammonium ion supplying substances, hydrazine, ethylenediaminetetraacetic acid, nitorilotriacetic acid, uracil diacetic acid, dimethylglyoxime, dithizone, oxine, acetyl acetone and glycine.

Further, the peak intensity ratio [(a)/(b)] may vary by controlling the calcination conditions. That is, when the calcination temperature is raised, there is such a tendency that the peak intensity ratio [(a)/(b)] is lowered, i.e., the amount of $Li_2M'_{(1-y)}Mn_yO_3$ having a crystal system belonging to a space group of C2/m is reduced. On the contrary, when the calcination temperature is dropped, there is such a tendency that the peak intensity ratio [(a)/(b)] is increased, i.e., the amount of $Li_2M'_{(1-y)}Mn_yO_3$ having a crystal system belonging to a space group of C2/m is increased.

Next, the positive electrode comprising the positive electrode active substance particles according to the present invention is described.

When producing the positive electrode comprising the positive electrode active substance particles according to the present invention, a conducting agent and a binder are added to and mixed with the positive electrode active substance particles by an ordinary method. Examples of the preferred conducting agent include acetylene black, carbon black and graphite. Examples of the preferred binder include polytetrafluoroethylene and polyvinylidene fluoride.

The secondary battery produced by using the positive electrode comprising the positive electrode active substance particles according to the present invention comprises the above positive electrode, a negative electrode and an electrolyte.

Examples of a negative electrode active substance which may be used for production of the negative electrode include metallic lithium, lithium/aluminum alloys, lithium/tin alloys, and graphite or black lead.

Also, as a solvent for the electrolyte solution, there may be used combination of ethylene carbonate and diethyl carbonate, as well as an organic solvent comprising at least one compound selected from the group consisting of carbonates such as propylene carbonate and dimethyl carbonate, and ethers such as dimethoxyethane.

Further, as the electrolyte, there may be used a solution prepared by dissolving lithium phosphate hexafluoride as well as at least one lithium salt selected from the group consisting of lithium perchlorate and lithium borate tetrafluoride in the above solvent.

The secondary battery produced by using the positive electrode comprising the positive electrode active substance particles according to the present invention has an initial discharge capacity of not less than 190 mAh/g, preferably not less than 200 mAh/g, more preferably not less than 220 mAh/g and still more preferably not less than 230 mAh/g as measured by the below-mentioned evaluation method. The initial discharge capacity of the secondary battery is preferably as high as possible. The ratio of a discharge capacity at the 32nd cycle to a discharge capacity at the 3rd cycle [(32nd cycle discharge capacity)/(3rd cycle discharge capacity)×100(%)] of the secondary battery is not less than 85%, preferably not less than 90%, more preferably not less than 98% and still more preferably not less than 99%.

The thermal stability of the positive electrode comprising the positive electrode active substance particles according to the present invention may be controlled such that the heat generation initiation temperature of the positive electrode as measured by the below-mentioned evaluation method is not lower than 215° C., preferably not lower than 220° C., more preferably not lower than 225° C. and still more preferably not lower than 235° C. The heat generation initiation temperature of the positive electrode is preferably as high as possible.

<Function>

It is considered by the present inventors that in the present invention, the boron, fluorine and element A components are present on the surface of the respective primary particles which are in turn present on the respective secondary particles substantially without forming a solid solution thereof in the positive electrode active substance particles, and the interaction between these components and the Li—Mn compound present on the surface of the respective particles serves for suppressing excessive contact between the electrolyte solution and the positive electrode material, so that the resulting secondary battery can be enhanced in cycle characteristics and thermal stability.

EXAMPLES

Typical examples of the present invention are as follows.

The BET specific surface area was measured by a BET method using nitrogen.

The contents of the element A, lithium, nickel, cobalt, manganese and boron constituting the positive electrode active substance particles were determined as follow. That is, the positive electrode active substance particles were dissolved in an acid, and the resulting solution was analyzed by a plasma emission spectroscopic device "ICPS-7500" (manufactured by Shimadzu Seisakusho Co., Ltd.).

The identification of the phase and the measurement of the intensity were carried out by X-ray diffraction analysis. The X-ray diffraction analysis was conducted using an X-ray diffractometer "RINT-2000" manufactured by Rigaku Co., Ltd., (tube: Cu; tube voltage: 40 kV; tube current: 40 mA; step angle: 0.020°; count time: 0.6 s; divergence slit: 1°; scattering slit: 1°; light-receiving slit: 0.30 mm).

The average primary particle diameter and average secondary particle diameter of the particles were observed and determined using a scanning electron microscope "SEM-EDX" equipped with an energy disperse type X-ray analyzer (manufactured by Hitachi High-Technologies Corp.).

The coin cell produced by using the positive electrode active substance particles was evaluated for charge/discharge characteristics and cycle characteristics.

First, 84% by weight of the composite oxide as a positive electrode active substance, 4% by weight of acetylene black and 4% by weight of a graphite "KS-6" both serving as a conducting material, and 8% by weight of polyvinylidene fluoride dissolved in N-methyl pyrrolidone as a binder, were mixed with each other, and the resulting mixture was applied onto a metallic Al foil and then dried at 150° C. The thus obtained sheets were blanked into 16 mmϕ and then compression-bonded to each other under a pressure of 1 t/cm², thereby producing an electrode having a thickness of 50 μm and using the thus produced electrode as a positive electrode. A metallic lithium sheet blanked into 16 mmϕ was used as a negative electrode, and a solution prepared by mixing EC and DMC with each other at a volume ratio of 1:2 in which 1 mol/L of $LiPF_6$ was dissolved, was used as an electrolyte solution, thereby producing a coin cell of a CR2032 type.

The initial charge/discharge cycle of the coin cell was conducted as follows. That is, while being kept at 25° C., the coin cell was charged at a current density of 20 mA/g until reaching 4.6 V and then charged at a constant voltage until the current value reached 1/100, and discharged at a current density of 20 mA/g until reaching 2.0 V. In the second and subsequent charge/discharge cycles, while being kept at 25° C., the coin cell was charged at 54 mA/g until reaching 4.6 V and then discharged at 135 mA/g until reaching 2.0 V.

The following thermal stability test was carried out using the positive electrode active substance particles.

Figure 2:
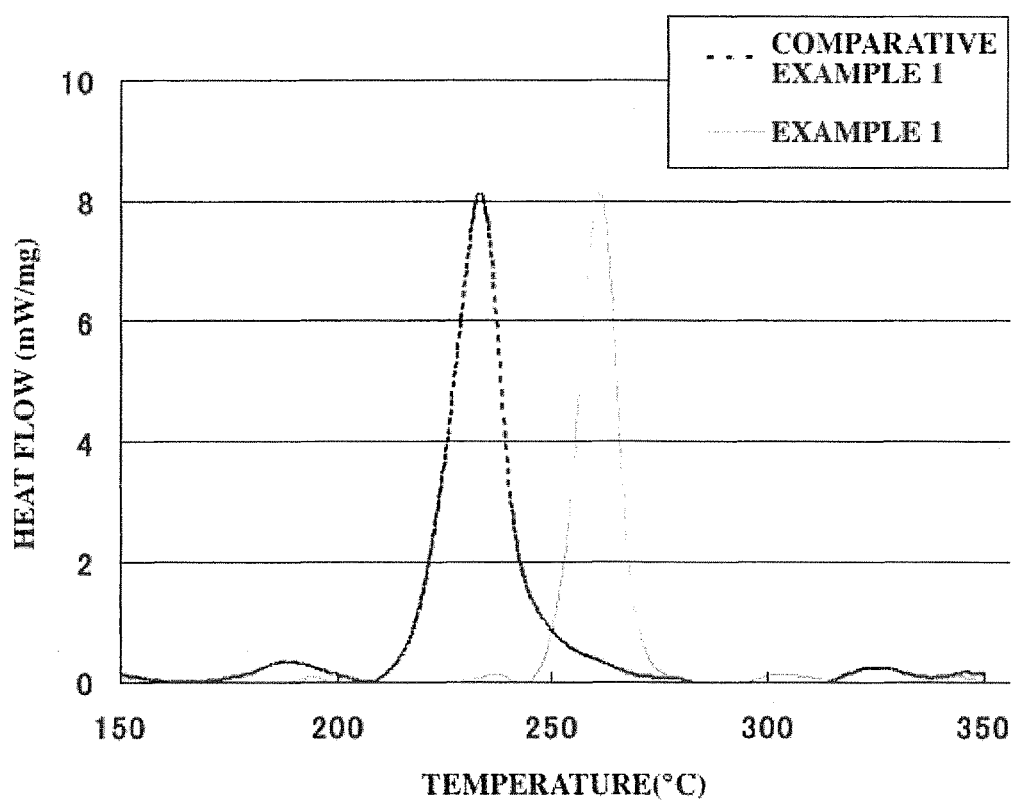
FIG. 2 is a diagram showing the results of a thermal stability test in which a positive electrode sheet obtained by coating a substrate with positive electrode active substance particles obtained in each of Example 1 and Comparative Example 3 was subjected to charge/discharge cycles.

The coil cell of a CR2032 type as produced by the same method as described above was subjected while being kept at 25° C. to initial charging/discharging cycles in which the cell was charged at 20 mA/g until reaching 4.8 V and further charged at a constant voltage until reacting a current value of 1/10, and then discharged at 20 mA/g until reaching 2.0 V, and thereafter subjected to 2nd charging cycle in which the cell was charged at 20 mA/g until reaching 4.8 V and further charged at a constant voltage until reacting a current value of 1/10. Under this condition, the coin cell was rapidly disassembled to take out the positive electrode therefrom. Then, 1 mg of the positive electrode test piece was placed in a hermetically sealed SUS pressure cell in the co-existence of 2.0 μL of an electrolyte solution comprising 1 M-$LiPF_6$/ (EC:DEC=1:1), and subjected to differential thermal analysis at a scanning speed of 5° C./min in a temperature range of from room temperature to 460° C. using a differential thermal analyzer "DSC-60" manufactured by Shimadzu Corp. In the present invention, for example, in FIG. 2 showing a graph of a heat flow relative to a temperature, the temperature at a rise-up portion of a maximum peak of the heat flow was defined as a heat generation initiation temperature.

Example 1

A closed type reaction vessel was charged with 14 L of water, and an inside of the reaction vessel was maintained at 50° C. while flowing a nitrogen gas therethrough. Further, a Ni-, Co- and Mn-sulfate mixed aqueous solution and an aqueous sodium carbonate solution were successively added into the reaction vessel while stirring such that the pH value therein was adjusted to 8.2 (±0.2). During the reaction, a filtrate only was discharged out of the reaction system using a concentration device, whereas a solid component separated from the filtrate was retained in the reaction vessel. After completion of the reaction, a slurry comprising a co-precipitated product was obtained. The thus obtained slurry was filtered, and the resulting solid was washed with water and dried at 105° C. overnight, thereby obtaining a co-precipitated precursor in the form of particles.

The thus obtained co-precipitated precursor, lithium carbonate particles and boric acid were weighed and intimately mixed with each other. The resulting mixture was calcined at 830° C. for 5 hr under an air flow using an electric furnace.

Next, the resulting calcined product was charged into an aqueous aluminum nitrate solution, and while stirring at 20° C., an ammonium fluoride solution was added dropwise thereinto, followed by maintaining the resulting solution at 80° C. for 2 hr. The thus obtained slurry was filtered, and the resulting solid was dried at 105° C. overnight and then subjected to heat treatment at 350° C. for 5 hr under an air flow using an electric furnace, thereby obtaining positive electrode active substance particles.

As a result of subjecting the resulting positive electrode active substance particles to X-ray diffraction analysis, it was confirmed that the positive electrode active substance particles comprised a crystal system belonging to a space group of R-3m and a crystal system belonging to a space group of C2/m, and had a peak intensity ratio [(a)/(b)] of 0.071.

In addition, as a result of subjecting the resulting positive electrode active substance particles to ICP composition analysis, it was confirmed that the molar ratio of Li/(Ni+Co+Mn) was 1.32; the molar ratio of Ni:Co:Mn was 21.6: 12.4:66 (i.e., the molar ratio of Mn/(Ni+Co+Mn) was 0.66); the boron (B) content was 0.092% by weight; the fluorine (F) content was 0.81% by weight; the aluminum (Al) content was 0.384% by weight; and the BET specific surface area as measured by a nitrogen absorption method was 3.5 m²/g. Further, as a result of observing the positive electrode active substance particles using a scanning electron microscope (SEM), it was recognized that primary particles thereof having an average primary particle diameter of 0.07 μm were aggregated together to form secondary particles having an average secondary particle diameter of 12.1 μm.

Example 2

A closed type reaction vessel was charged with 14 L of water, and an inside of the reaction vessel was maintained at 40° C. while flowing a nitrogen gas therethrough. Further, a Ni-, Co- and Mn-sulfate mixed aqueous solution, an aqueous sodium hydroxide solution and an aqueous ammonia solution were successively added into the reaction vessel while stirring such that the pH value therein was adjusted to 11.4 (±0.2). During the reaction, a filtrate only was discharged out of the reaction system using a concentration device, whereas a solid component separated from the filtrate was retained in the reaction vessel. After completion of the reaction, a slurry comprising a co-precipitated product was obtained. The thus obtained slurry was filtered, and the resulting solid was washed with water and dried at 105° C. overnight, thereby obtaining a co-precipitated precursor in the form of particles.

The thus obtained co-precipitated precursor, lithium hydroxide particles and boric acid were weighed and intimately mixed with each other. The resulting mixture was calcined at 920° C. for 5 hr under an air flow using an electric furnace.

Next, the resulting calcined product was charged into an aqueous aluminum nitrate solution, and while stirring at 25° C., an ammonium fluoride solution was added dropwise thereinto, followed by maintaining the resulting solution at 85° C. for 1 hr. The thus obtained slurry was filtered, and the resulting solid was dried at 105° C. overnight and then subjected to heat treatment at 400° C. for 3 hr under an air flow using an electric furnace, thereby obtaining positive electrode active substance particles.

Example 3

A closed type reaction vessel was charged with 14 L of water, and an inside of the reaction vessel was maintained at 60° C. while flowing a nitrogen gas therethrough. Further, a Ni-, Co- and Mn-sulfate mixed aqueous solution, an aqueous sodium carbonate solution and an aqueous ammonia solution were successively added into the reaction vessel while stirring such that the pH value therein was adjusted to 8.1 (±0.2). During the reaction, a filtrate only was discharged out of the reaction system using a concentration device, whereas a solid component separated from the filtrate was retained in the reaction vessel. After completion of the reaction, a slurry comprising a co-precipitated product was obtained. The thus obtained slurry was filtered, and the resulting solid was washed with water and dried at 110° C. overnight, thereby obtaining a co-precipitated precursor in the form of particles.

The thus obtained co-precipitated precursor, lithium carbonate particles, boric acid and aluminum fluoride were weighed and intimately mixed with each other. The resulting mixture was calcined at 850° C. for 7 hr under an air flow using an electric furnace, thereby obtaining positive electrode active substance particles.

Example 4

A closed type reaction vessel was charged with 14 L of water, and an inside of the reaction vessel was maintained at 45° C. while flowing a nitrogen gas therethrough. Further, a Ni-, Co- and Mn-sulfate mixed aqueous solution, an aqueous sodium hydroxide solution and an aqueous ammonia solution were successively added into the reaction vessel while stirring such that the pH value therein was adjusted to 11.1 (±0.2). During the reaction, a filtrate only was discharged out of the reaction system using a concentration device, whereas a solid component separated from the filtrate was retained in the reaction vessel. After completion of the reaction, a slurry comprising a co-precipitated product was obtained. The thus obtained slurry was filtered, and the resulting solid was washed with water and dried at 100° C. overnight, thereby obtaining a co-precipitated precursor in the form of particles.

The thus obtained co-precipitated precursor, lithium hydroxide particles, boric acid, lithium fluoride and aluminum hydroxide were weighed and intimately mixed with each other. The resulting mixture was calcined at 900° C. for 5 hr under an air flow using an electric furnace, thereby obtaining positive electrode active substance particles.

Example 5

A closed type reaction vessel was charged with 14 L of water, and an inside of the reaction vessel was maintained at 55° C. while flowing a nitrogen gas therethrough. Further, a Ni-, Co- and Mn-sulfate mixed aqueous solution, an aqueous sodium carbonate solution and an aqueous ammonia solution were successively added into the reaction vessel while stirring such that the pH value therein was adjusted to 8.4 (±0.2). During the reaction, a filtrate only was discharged out of the reaction system using a concentration device, whereas a solid component separated from the filtrate was retained in the reaction vessel. After completion of the reaction, a slurry comprising a co-precipitated product was obtained. The thus obtained slurry was filtered, and the resulting solid was washed with water. Into the filter cake comprising the thus obtained co-precipitated precursor were added an aqueous boric acid solution, an aqueous ammonium fluoride solution and an aqueous aluminum nitrate solution, and the resulting mixture was intimately kneaded and dried at 105° C. overnight, thereby obtaining dried particles.

The thus obtained dried particles and lithium carbonate particles were weighed and intimately mixed with each other. The resulting mixture was calcined at 780° C. for 10 hr under an air flow using an electric furnace, thereby obtaining positive electrode active substance particles.

Example 6

A closed type reaction vessel was charged with 14 L of water, and an inside of the reaction vessel was maintained at 60° C. while flowing a nitrogen gas therethrough. Further, a Ni-, Co- and Mn-sulfate mixed aqueous solution, an aqueous sodium carbonate solution and an aqueous ammonia solution were successively added into the reaction vessel while stirring such that the pH value therein was adjusted to 8.1 (±0.2). During the reaction, while the reaction slurry was overflowed, the slurry was sequentially discharged out of the reaction system, and the slurry comprising a co-precipitated product was obtained. The thus obtained slurry was filtered, and the resulting solid was washed with water and dried at 100° C. overnight, thereby obtaining a co-precipitated precursor in the form of particles.

The thus obtained co-precipitated precursor, lithium hydroxide particles, boric acid and aluminum fluoride were weighed and intimately mixed with each other. The resulting mixture was calcined at 1250° C. for 1 hr under an air flow using an electric furnace, thereby obtaining positive electrode active substance particles.

Example 7

A closed type reaction vessel was charged with 14 L of water, and an inside of the reaction vessel was maintained at 50° C. while flowing a nitrogen gas therethrough. Further, a Ni-, Co- and Mn-sulfate mixed aqueous solution, an aqueous sodium carbonate solution and an aqueous ammonia solution were successively added into the reaction vessel while stirring such that the pH value therein was adjusted to 8.1 (±0.2). During the reaction, while the reaction slurry was overflowed, the slurry was sequentially discharged out of the reaction system, and the slurry comprising a co-precipitated product was obtained. The thus obtained slurry was filtered, and the resulting solid was washed with water and dried at 100° C. overnight, thereby obtaining a co-precipitated precursor in the form of particles.

The thus obtained co-precipitated precursor, lithium hydroxide particles and boric acid were weighed and intimately mixed with each other. The resulting mixture was calcined at 870° C. for 5 hr under an air flow using an electric furnace.

Next, the resulting calcined product was charged into an aqueous aluminum nitrate solution, and while stirring at 20° C., an ammonium fluoride solution was added dropwise thereinto, followed by maintaining the resulting solution at 80° C. for 3 hr. The thus obtained slurry was filtered, and the resulting solid was dried at 105° C. overnight and then subjected to heat treatment at 250° C. for 5 hr under an air flow using an electric furnace, thereby obtaining positive electrode active substance particles.

Example 8

A closed type reaction vessel was charged with 14 L of water, and an inside of the reaction vessel was maintained at 40° C. while flowing a nitrogen gas therethrough. Further, a Ni-, Co- and Mn-sulfate mixed aqueous solution, an aqueous sodium carbonate solution and an aqueous ammonia solution were successively added into the reaction vessel while stirring such that the pH value therein was adjusted to 8.0 (±0.1). During the reaction, while the reaction slurry was overflowed, the slurry was sequentially discharged out of the reaction system, and the slurry comprising a co-precipitated product was obtained. The thus obtained slurry was filtered, and the resulting solid was washed with water and dried at 100° C. overnight, thereby obtaining a co-precipitated precursor in the form of particles.

The thus obtained co-precipitated precursor, lithium hydroxide particles and boric acid were weighed and intimately mixed with each other. The resulting mixture was calcined at 690° C. for 15 hr under an air flow using an electric furnace.

Next, the resulting calcined product was charged into an aqueous aluminum nitrate solution, and while stirring at 15° C., an ammonium fluoride solution was added dropwise thereinto, followed by maintaining the resulting solution at 80° C. for 3 hr. The thus obtained slurry was filtered, and the resulting solid was dried at 105° C. overnight and then subjected to heat treatment at 550° C. for 2 hr under an air flow using an electric furnace, thereby obtaining positive electrode active substance particles.

Example 9

A closed type reaction vessel was charged with 14 L of water, and an inside of the reaction vessel was maintained at 70° C. while flowing a nitrogen gas therethrough. Further, a Ni-, Co- and Mn-nitrate mixed aqueous solution, an aqueous sodium carbonate solution and an aqueous ammonia solution were successively added into the reaction vessel while stirring such that the pH value therein was adjusted to 8.2 (±0.2). During the reaction, while the reaction slurry was overflowed, the slurry was sequentially discharged out of the reaction system, and the slurry comprising a co-precipitated product was obtained. The thus obtained slurry was filtered, and the resulting solid was washed with water and dried at 100° C. overnight, thereby obtaining a co-precipitated precursor in the form of particles.

The thus obtained co-precipitated precursor, lithium nitrate particles, diboron trioxide, lithium fluoride and alumina were weighed and intimately mixed with each other. The resulting mixture was calcined at 1100° C. for 2 hr under an oxygen flow using an electric furnace, thereby obtaining positive electrode active substance particles.

Example 10

A closed type reaction vessel was charged with 14 L of water, and an inside of the reaction vessel was maintained at 40° C. while flowing a nitrogen gas therethrough. Further, a Ni-, Co- and Mn-sulfate mixed aqueous solution, an aqueous sodium hydroxide solution and an aqueous ammonia solution were successively added into the reaction vessel while stirring such that the pH value therein was adjusted to 9.3 (±0.2). During the reaction, a filtrate only was discharged out of the reaction system using a concentration device, whereas a solid component separated from the filtrate was retained in the reaction vessel. After completion of the reaction, a slurry comprising a co-precipitated product was obtained. The thus obtained slurry was filtered, and the resulting solid was washed with water and dried at 100° C. overnight, thereby obtaining a co-precipitated precursor in the form of particles.

The thus obtained co-precipitated precursor, lithium carbonate particles, boric acid and magnesium fluoride were weighed and intimately mixed with each other. The resulting mixture was calcined at 910° C. for 5 hr under an air flow using an electric furnace, thereby obtaining positive electrode active substance particles.

Example 11

A closed type reaction vessel was charged with 14 L of water, and an inside of the reaction vessel was maintained at 50° C. while flowing a nitrogen gas therethrough. Further, a Ni-, Co- and Mn-sulfate mixed aqueous solution and an aqueous sodium carbonate solution were successively added into the reaction vessel while stirring such that the pH value therein was adjusted to 9.0 (±0.2). During the reaction, a filtrate only was discharged out of the reaction system using a concentration device, whereas a solid component separated from the filtrate was retained in the reaction vessel. After completion of the reaction, a slurry comprising a co-precipitated product was obtained. The thus obtained slurry was filtered, and the resulting solid was washed with water and dried at 100° C. overnight, thereby obtaining a co-precipitated precursor in the form of particles.

The thus obtained co-precipitated precursor, lithium carbonate particles and boric acid were weighed and intimately mixed with each other. The resulting mixture was calcined at 850° C. for 5 hr under an air flow using an electric furnace.

Next, the resulting calcined product was charged into an aqueous magnesium nitrate solution, and while stirring at 20° C., an ammonium fluoride solution was added dropwise thereinto, followed by maintaining the resulting solution at 80° C. for 3 hr. The thus obtained slurry was filtered, and the resulting solid was dried at 60° C. overnight and then subjected to heat treatment at 150° C. for 10 hr under an air flow using an electric furnace, thereby obtaining positive electrode active substance particles.

Example 12

A closed type reaction vessel was charged with 14 L of water, and an inside of the reaction vessel was maintained at 40° C. while flowing a nitrogen gas therethrough. Further, a Ni-, Co- and Mn-sulfate mixed aqueous solution, an aqueous sodium hydroxide solution and an aqueous ammonia solution were successively added into the reaction vessel while stirring such that the pH value therein was adjusted to 10.2 (±0.2). During the reaction, a filtrate only was discharged out of the reaction system using a concentration device, whereas a solid component separated from the filtrate was retained in the reaction vessel. After completion of the reaction, a slurry comprising a co-precipitated product was obtained. The thus obtained slurry was filtered, and the resulting solid was washed with water and dried at 100° C. overnight, thereby obtaining a co-precipitated precursor in the form of particles.

The thus obtained co-precipitated precursor, lithium carbonate particles and boric acid were weighed and intimately mixed with each other. The resulting mixture was calcined at 900° C. for 5 hr under an air flow using an electric furnace.

The resulting calcined product and titanium fluoride were weighed and intimately mixed with each other. The resulting mixture was calcined at 150° C. for 3 hr under an air flow using an electric furnace, thereby obtaining positive electrode active substance particles.

Example 13

A closed type reaction vessel was charged with 14 L of water, and an inside of the reaction vessel was maintained at 50° C. while flowing a nitrogen gas therethrough. Further, a Ni-, Co- and Mn-sulfate mixed aqueous solution, an aqueous sodium carbonate solution and an aqueous ammonia solution were successively added into the reaction vessel while stirring such that the pH value therein was adjusted to 8.5 (±0.2). During the reaction, a filtrate only was discharged out of the reaction system using a concentration device, whereas a solid component separated from the filtrate was retained in the reaction vessel. After completion of the reaction, a slurry comprising a co-precipitated product was obtained. The thus obtained slurry was filtered, and the resulting solid was washed with water and dried at 100° C. overnight, thereby obtaining a co-precipitated precursor in the form of particles.

The thus obtained co-precipitated precursor, lithium carbonate particles and boric acid were weighed and intimately mixed with each other. The resulting mixture was calcined at 830° C. for 5 hr under an air flow using an electric furnace.

Next, the resulting calcined product was charged into an aqueous titanium nitrate solution, and while stirring at 20° C., an ammonium fluoride solution was added dropwise thereinto, followed by maintaining the resulting solution at 80° C. for 2 hr. The thus obtained slurry was filtered, and the resulting solid was dried at 100° C. overnight and then subjected to heat treatment at 400° C. for 3 hr under an air flow using an electric furnace, thereby obtaining positive electrode active substance particles.

Example 14

A closed type reaction vessel was charged with 14 L of water, and an inside of the reaction vessel was maintained at 40° C. while flowing a nitrogen gas therethrough. Further, a Ni-, Co- and Mn-sulfate mixed aqueous solution, an aqueous sodium hydroxide solution and an aqueous ammonia solution were successively added into the reaction vessel while stirring such that the pH value therein was adjusted to 11.2 (±0.2). During the reaction, a filtrate only was discharged out of the reaction system using a concentration device, whereas a solid component separated from the filtrate was retained in the reaction vessel. After completion of the reaction, a slurry comprising a co-precipitated product was obtained. The thus obtained slurry was filtered, and the resulting solid was washed with water and dried at 100° C. overnight, thereby obtaining a co-precipitated precursor in the form of particles.

The thus obtained co-precipitated precursor, lithium carbonate particles and boric acid were weighed and intimately mixed with each other. The resulting mixture was calcined at 900° C. for 5 hr under an air flow using an electric furnace.

The resulting calcined product and zirconium fluoride were weighed and intimately mixed with each other. The resulting mixture was subjected to heat treatment at 150° C. for 5 hr under an air flow using an electric furnace, thereby obtaining positive electrode active substance particles.

Example 15

A closed type reaction vessel was charged with 14 L of water, and an inside of the reaction vessel was maintained at 55° C. while flowing a nitrogen gas therethrough. Further, a Ni-, Co- and Mn-nitrate mixed aqueous solution, an aqueous sodium carbonate solution and an aqueous ammonia solution were successively added into the reaction vessel while stirring such that the pH value therein was adjusted to 8.1 (±0.2). During the reaction, a filtrate only was discharged out of the reaction system using a concentration device, whereas a solid component separated from the filtrate was retained in the reaction vessel. After completion of the reaction, a slurry comprising a co-precipitated product was obtained. The thus obtained slurry was filtered, and the resulting solid was washed with water and dried at 100° C. overnight, thereby obtaining a co-precipitated precursor in the form of particles.

The thus obtained co-precipitated precursor, lithium carbonate particles, diboron trioxide and calcium fluoride were weighed and intimately mixed with each other. The resulting mixture was calcined at 840° C. for 10 hr under an air flow using an electric furnace, thereby obtaining positive electrode active substance particles.

Example 16

A closed type reaction vessel was charged with 14 L of water, and an inside of the reaction vessel was maintained at 50° C. while flowing a nitrogen gas therethrough. Further, a Ni-, Co- and Mn-chloride mixed aqueous solution, an aqueous sodium hydroxide solution and an aqueous ammonia solution were successively added into the reaction vessel while stirring such that the pH value therein was adjusted to 11.5 (±0.2). During the reaction, a filtrate only was discharged out of the reaction system using a concentration device, whereas a solid component separated from the filtrate was retained in the reaction vessel. After completion of the reaction, a slurry comprising a co-precipitated product was obtained. The thus obtained slurry was filtered, and the resulting solid was washed with water and dried at 120° C. overnight, thereby obtaining a co-precipitated precursor in the form of particles.

The thus obtained co-precipitated precursor, lithium nitrate particles and boric acid were weighed and intimately mixed with each other. The resulting mixture was calcined at 920° C. for 5 hr under an air flow using an electric furnace.

Next, the resulting calcined product was charged into an aqueous ferric nitrate solution, and while stirring at 20° C., an ammonium fluoride solution was added dropwise thereinto, followed by maintaining the resulting solution at 80° C. for 3 hr. The thus obtained slurry was filtered, and the resulting solid was dried at 100° C. overnight and then subjected to heat treatment at 250° C. for 2 hr under an air flow using an electric furnace, thereby obtaining positive electrode active substance particles.

Example 17

A closed type reaction vessel was charged with 14 L of water, and an inside of the reaction vessel was maintained at 50° C. while flowing a nitrogen gas therethrough. Further, a Ni-, Co- and Mn-sulfate mixed aqueous solution, an aqueous sodium hydroxide solution and a lithium carbonate slurry were successively added into the reaction vessel while stirring such that the pH value therein was adjusted to 8.2 (±0.2). During the reaction, a filtrate only was discharged out of the reaction system using a concentration device, whereas a solid component separated from the filtrate was retained in the reaction vessel. After completion of the reaction, a slurry comprising a co-precipitated product was obtained. The thus obtained slurry was filtered, and the resulting solid was washed with water and dried at 100° C. overnight, thereby obtaining a co-precipitated precursor in the form of particles.

The thus obtained co-precipitated precursor, lithium carbonate particles and boric acid were weighed and intimately mixed with each other. The resulting mixture was calcined at 810° C. for 5 hr under an air flow using an electric furnace.

The resulting calcined product and zinc fluoride were weighed and intimately mixed with each other. The resulting mixture was subjected to heat treatment at 300° C. for 3 hr under an air flow using an electric furnace, thereby obtaining positive electrode active substance particles.

Example 18

A closed type reaction vessel was charged with 14 L of water, and an inside of the reaction vessel was maintained at 35° C. while flowing a nitrogen gas therethrough. Further, a Ni-, Co- and Mn-chloride mixed aqueous solution, an aqueous lithium hydroxide solution and an aqueous hydrazine solution were successively added into the reaction vessel while stirring such that the pH value therein was adjusted to 11.3 (±0.2). During the reaction, a filtrate only was discharged out of the reaction system using a concentration device, whereas a solid component separated from the filtrate was retained in the reaction vessel. After completion of the reaction, a slurry comprising a co-precipitated product was obtained. The thus obtained slurry was filtered, and the resulting solid was washed with water and dried at 100° C. overnight, thereby obtaining a co-precipitated precursor in the form of particles.

The thus obtained co-precipitated precursor, lithium hydroxide particles, boric acid, lithium fluoride and lithium molybdate were weighed and intimately mixed with each other. The resulting mixture was calcined at 910° C. for 5 hr under an oxygen flow using an electric furnace, thereby obtaining positive electrode active substance particles.

Example 19

A closed type reaction vessel was charged with 14 L of water, and an inside of the reaction vessel was maintained at 55° C. while flowing a nitrogen gas therethrough. Further, a Ni-, Co- and Mn-sulfate mixed aqueous solution and an aqueous sodium carbonate solution were successively added into the reaction vessel while stirring such that the pH value therein was adjusted to 8.3 (±0.2). During the reaction, a filtrate only was discharged out of the reaction system using a concentration device, whereas a solid component separated from the filtrate was retained in the reaction vessel. After completion of the reaction, a slurry comprising a co-precipitated product was obtained. The thus obtained slurry was filtered, and the resulting solid was washed with water and dried at 100° C. overnight, thereby obtaining a co-precipitated precursor in the form of particles.

The thus obtained co-precipitated precursor, lithium carbonate particles, boric acid, lithium fluoride and bismuth oxide were weighed and intimately mixed with each other. The resulting mixture was calcined at 830° C. for 7 hr under an air flow using an electric furnace, thereby obtaining positive electrode active substance particles.

Example 20

A closed type reaction vessel was charged with 14 L of water, and an inside of the reaction vessel was maintained at 30° C. while flowing a nitrogen gas therethrough. Further, a Ni-, Co- and Mn-sulfate mixed aqueous solution, an aqueous sodium hydroxide solution and an aqueous ammonia solution were successively added into the reaction vessel while stirring such that the pH value therein was adjusted to 11.1 (±0.2). During the reaction, a filtrate only was discharged out of the reaction system using a concentration device, whereas a solid component separated from the filtrate was retained in the reaction vessel. After completion of the reaction, a slurry comprising a co-precipitated product was obtained. The thus obtained slurry was filtered, and the resulting solid was washed with water and dried at 100° C. overnight, thereby obtaining a co-precipitated precursor in the form of particles.

The thus obtained co-precipitated precursor, lithium carbonate particles, boric acid, magnesium fluoride and aluminum fluoride were weighed and intimately mixed with each other. The resulting mixture was calcined at 910° C. for 7 hr under an air flow using an electric furnace, thereby obtaining positive electrode active substance particles.

Example 21

A closed type reaction vessel was charged with 14 L of water, and an inside of the reaction vessel was maintained at 60° C. while flowing a nitrogen gas therethrough. Further, a Ni-, Co- and Mn-sulfate mixed aqueous solution and an aqueous sodium carbonate solution were successively added into the reaction vessel while stirring such that the pH value therein was adjusted to 8.5 (±0.2). During the reaction, a filtrate only was discharged out of the reaction system using a concentration device, whereas a solid component separated from the filtrate was retained in the reaction vessel. After completion of the reaction, a slurry comprising a co-precipitated product was obtained. The thus obtained slurry was filtered, and the resulting solid was washed with water and dried at 105° C. overnight, thereby obtaining a co-precipitated precursor in the form of particles.

The thus obtained co-precipitated precursor, lithium carbonate particles, boric acid and magnesium hydroxide were weighed and intimately mixed with each other. The resulting mixture was calcined at 820° C. for 5 hr under an air flow using an electric furnace.

Next, the resulting calcined product was charged into an aqueous aluminum nitrate solution, and while stirring at 25° C., an ammonium fluoride solution was added dropwise thereinto, followed by maintaining the resulting solution at 85° C. for 1 hr. The thus obtained slurry was filtered, and the resulting solid was dried at 105° C. overnight and then subjected to heat treatment at 400° C. for 3 hr under an air flow using an electric furnace, thereby obtaining positive electrode active substance particles.

Example 22

A closed type reaction vessel was charged with 14 L of water, and an inside of the reaction vessel was maintained at 40° C. while flowing a nitrogen gas therethrough. Further, a Ni-, Co- and Mn-sulfate mixed aqueous solution, an aqueous sodium hydroxide solution and an aqueous ammonia solution were successively added into the reaction vessel while stirring such that the pH value therein was adjusted to 11.5 (±0.2). During the reaction, a filtrate only was discharged out of the reaction system using a concentration device, whereas a solid component separated from the filtrate was retained in the reaction vessel. After completion of the reaction, a slurry comprising a co-precipitated product was obtained. The thus obtained slurry was filtered, and the resulting solid was washed with water and dried at 105° C. overnight, thereby obtaining a co-precipitated precursor in the form of particles.

The thus obtained co-precipitated precursor, lithium carbonate particles, boric acid and titanium oxide were weighed and intimately mixed with each other. The resulting mixture was calcined at 930° C. for 5 hr under an air flow using an electric furnace.

Next, the resulting calcined product was charged into an aqueous aluminum nitrate solution, and while stirring at 20° C., an ammonium fluoride solution was added dropwise thereinto, followed by maintaining the resulting solution at 80° C. for 3 hr. The thus obtained slurry was filtered, and the resulting solid was dried at 105° C. overnight and then subjected to heat treatment at 400° C. for 3 hr under an air flow using an electric furnace, thereby obtaining positive electrode active substance particles.

Example 23

A closed type reaction vessel was charged with 14 L of water, and an inside of the reaction vessel was maintained at 40° C. while flowing a nitrogen gas therethrough. Further, a Ni-, Co- and Mn-sulfate mixed aqueous solution and an aqueous sodium carbonate solution were successively added into the reaction vessel while stirring such that the pH value therein was adjusted to 8.5 (±0.2). During the reaction, a filtrate only was discharged out of the reaction system using a concentration device, whereas a solid component separated from the filtrate was retained in the reaction vessel. After completion of the reaction, a slurry comprising a co-precipitated product was obtained. The thus obtained slurry was filtered, and the resulting solid was washed with water and dried at 100° C. overnight, thereby obtaining a co-precipitated precursor in the form of particles.

The thus obtained co-precipitated precursor, lithium carbonate particles, boric acid, magnesium hydroxide and titanium oxide were weighed and intimately mixed with each other. The resulting mixture was calcined at 850° C. for 5 hr under an air flow using an electric furnace.

Next, the resulting calcined product was charged into an aqueous aluminum nitrate solution, and while stirring at 20° C., an ammonium fluoride solution was added dropwise thereinto, followed by maintaining the resulting solution at 80° C. for 3 hr. The thus obtained slurry was filtered, and the resulting solid was dried at 105° C. overnight and then subjected to heat treatment at 350° C. for 3 hr under an air flow using an electric furnace, thereby obtaining positive electrode active substance particles.

Example 24

A closed type reaction vessel was charged with 14 L of water, and an inside of the reaction vessel was maintained at 40° C. while flowing a nitrogen gas therethrough. Further, a Ni-, Co- and Mn-sulfate mixed aqueous solution, an aqueous sodium hydroxide solution and an aqueous ammonia solution were successively added into the reaction vessel while stirring such that the pH value therein was adjusted to 11.4 (±0.2). During the reaction, a filtrate only was discharged out of the reaction system using a concentration device, whereas a solid component separated from the filtrate was retained in the reaction vessel. After completion of the reaction, a slurry comprising a co-precipitated product was obtained. The thus obtained slurry was filtered, and the resulting solid was washed with water and dried at 100° C. overnight, thereby obtaining a co-precipitated precursor in the form of particles.

The thus obtained co-precipitated precursor, lithium carbonate particles, boric acid, lithium fluoride, aluminum fluoride, magnesium hydroxide and titanium oxide were weighed and intimately mixed with each other. The resulting mixture was calcined at 920° C. for 4 hr under an air flow using an electric furnace, thereby obtaining positive electrode active substance particles.

Example 25

A closed type reaction vessel was charged with 14 L of water, and an inside of the reaction vessel was maintained at 60° C. while flowing a nitrogen gas therethrough. Further, a Ni-, Co- and Mn-nitrate mixed aqueous solution, an aqueous sodium carbonate solution and an aqueous ammonia solution were successively added into the reaction vessel while stirring such that the pH value therein was adjusted to 8.2 (±0.2). During the reaction, a filtrate only was discharged out of the reaction system using a concentration device, whereas a solid component separated from the filtrate was retained in the reaction vessel. After completion of the reaction, a slurry comprising a co-precipitated product was obtained. The thus obtained slurry was filtered, and the resulting solid was washed with water and dried at 100° C. overnight, thereby obtaining a co-precipitated precursor in the form of particles.

The thus obtained co-precipitated precursor, lithium nitrate particles and boric acid were weighed and intimately mixed with each other. The resulting mixture was calcined at 920° C. for 5 hr under an air flow using an electric furnace.

Next, the resulting calcined product was charged into an aqueous aluminum nitrate solution, and while stirring at 20° C., an ammonium fluoride solution was added dropwise thereinto, followed by maintaining the resulting solution at 75° C. for 3 hr. The thus obtained slurry was filtered, and the resulting solid was dried at 105° C. overnight and then subjected to heat treatment at 350° C. for 5 hr under an air flow using an electric furnace, thereby obtaining positive electrode active substance particles.

Example 26

A closed type reaction vessel was charged with 14 L of water, and an inside of the reaction vessel was maintained at 60° C. while flowing a nitrogen gas therethrough. Further, a Co- and Mn-nitrate mixed aqueous solution, an aqueous sodium carbonate solution and an aqueous ammonia solution were successively added into the reaction vessel while stirring such that the pH value therein was adjusted to 8.4 (±0.2). During the reaction, a filtrate only was discharged out of the reaction system using a concentration device, whereas a solid component separated from the filtrate was retained in the reaction vessel. After completion of the reaction, a slurry comprising a co-precipitated product was obtained. The thus obtained slurry was filtered, and the resulting solid was washed with water and dried at 100° C. overnight, thereby obtaining a co-precipitated precursor in the form of particles.

The thus obtained co-precipitated precursor, lithium nitrate particles and boric acid were weighed and intimately mixed with each other. The resulting mixture was calcined at 910° C. for 6 hr under an air flow using an electric furnace.

Next, the resulting calcined product was charged into an aqueous aluminum nitrate solution, and while stirring at 10° C., an ammonium fluoride solution was added dropwise thereinto, followed by maintaining the resulting solution at 80° C. for 1 hr. The thus obtained slurry was filtered, and the resulting solid was dried at 105° C. overnight and then subjected to heat treatment at 400° C. for 3 hr under an air flow using an electric furnace, thereby obtaining positive electrode active substance particles.

Example 27

A closed type reaction vessel was charged with 14 L of water, and an inside of the reaction vessel was maintained at 70° C. while flowing a nitrogen gas therethrough. Further, a Ni- and Mn-sulfate mixed aqueous solution, an aqueous sodium carbonate solution and an aqueous ammonia solution were successively added into the reaction vessel while stirring such that the pH value therein was adjusted to 8.1 (±0.2). During the reaction, a filtrate only was discharged out of the reaction system using a concentration device, whereas a solid component separated from the filtrate was retained in the reaction vessel. After completion of the reaction, a slurry comprising a co-precipitated product was obtained. The thus obtained slurry was filtered, and the resulting solid was washed with water and dried at 100° C. overnight, thereby obtaining a co-precipitated precursor in the form of particles.

The thus obtained co-precipitated precursor, lithium carbonate particles and boric acid were weighed and intimately mixed with each other. The resulting mixture was calcined at 900° C. for 5 hr under an air flow using an electric furnace.

Next, the resulting calcined product was charged into an aqueous aluminum nitrate solution, and while stirring at 20° C., an ammonium fluoride solution was added dropwise thereinto, followed by maintaining the resulting solution at 80° C. for 1 hr. The thus obtained slurry was filtered, and the resulting solid was dried at 105° C. overnight and then subjected to heat treatment at 300° C. for 3 hr under an air flow using an electric furnace, thereby obtaining positive electrode active substance particles.

Example 28

A closed type reaction vessel was charged with 14 L of water, and an inside of the reaction vessel was maintained at 45° C. while flowing a nitrogen gas therethrough. Further, a Ni-, Co- and Mn-sulfate mixed aqueous solution and an aqueous sodium carbonate solution were successively added into the reaction vessel while stirring such that the pH value therein was adjusted to 8.4 (±0.2). During the reaction, a filtrate only was discharged out of the reaction system using a concentration device, whereas a solid component separated from the filtrate was retained in the reaction vessel. After completion of the reaction, a slurry comprising a co-precipitated product was obtained. The thus obtained slurry was filtered, and the resulting solid was washed with water and dried at 105° C. overnight, thereby obtaining a co-precipitated precursor in the form of particles.

The thus obtained co-precipitated precursor, lithium carbonate particles and boric acid were weighed and intimately mixed with each other. The resulting mixture was calcined at 840° C. for 5 hr under an air flow using an electric furnace.

Next, the resulting calcined product was charged into an aqueous ammonium fluoride solution, and while stirring at 20° C., an aqueous aluminum nitrate solution was added dropwise thereinto, thereby obtaining a slurry. The thus obtained slurry was filtered, and the resulting solid was dried at 105° C. overnight and then subjected to heat treatment at 380° C. for 3 hr under an air flow using an electric furnace, thereby obtaining positive electrode active substance particles.

Example 29

A closed type reaction vessel was charged with 14 L of water, and an inside of the reaction vessel was maintained at 40° C. while flowing a nitrogen gas therethrough. Further, a Ni-, Co- and Mn-sulfate mixed aqueous solution, an aqueous sodium hydroxide solution and an aqueous ammonia solution were successively added into the reaction vessel while stirring such that the pH value therein was adjusted to 11.4 (±0.2). During the reaction, a filtrate only was discharged out of the reaction system using a concentration device, whereas a solid component separated from the filtrate was retained in the reaction vessel. After completion of the reaction, a slurry comprising a co-precipitated product was obtained. The thus obtained slurry was filtered, and the resulting solid was washed with water and dried at 105° C. overnight, thereby obtaining a co-precipitated precursor in the form of particles.

The thus obtained co-precipitated precursor, lithium hydroxide particles and boric acid were weighed and intimately mixed with each other. The resulting mixture was calcined at 910° C. for 5 hr under an air flow using an electric furnace.

Next, the resulting calcined product was charged into an aqueous ammonium fluoride solution, and while stirring at 25° C., an aqueous aluminum nitrate solution was added dropwise thereinto, thereby obtaining a slurry. The thus obtained slurry was filtered, and the resulting solid was dried at 100° C. overnight and then subjected to heat treatment at 400° C. for 3 hr under an air flow using an electric furnace, thereby obtaining positive electrode active substance particles.

Comparative Example 1

A closed type reaction vessel was charged with 14 L of water, and an inside of the reaction vessel was maintained at 40° C. while flowing a nitrogen gas therethrough. Further, a Ni-, Co- and Mn-sulfate mixed aqueous solution and an aqueous sodium carbonate solution were successively added into the reaction vessel while stirring such that the pH value therein was adjusted to 8.1 (±0.2). During the reaction, a filtrate only was discharged out of the reaction system using a concentration device, whereas a solid component separated from the filtrate was retained in the reaction vessel. After completion of the reaction, a slurry comprising a co-precipitated product was obtained. The thus obtained slurry was filtered, and the resulting solid was washed with water and dried at 100° C. overnight, thereby obtaining a co-precipitated precursor in the form of particles.

The thus obtained co-precipitated precursor, lithium carbonate particles, boric acid and aluminum fluoride were weighed and intimately mixed with each other. The resulting mixture was calcined at 900° C. for 5 hr under an air flow using an electric furnace, thereby obtaining positive electrode active substance particles.

Comparative Example 2

A closed type reaction vessel was charged with 14 L of water, and an inside of the reaction vessel was maintained at 60° C. while flowing a nitrogen gas therethrough. Further, a Ni-, Co- and Mn-sulfate mixed aqueous solution, an aqueous sodium carbonate solution and an aqueous ammonia solution were successively added into the reaction vessel while stirring such that the pH value therein was adjusted to 8.0 (±0.2). During the reaction, a filtrate only was discharged out of the reaction system using a concentration device, whereas a solid component separated from the filtrate was retained in the reaction vessel. After completion of the reaction, a slurry comprising a co-precipitated product was obtained. The thus obtained slurry was filtered, and the resulting solid was washed with water and dried at 100° C. overnight, thereby obtaining a co-precipitated precursor in the form of particles.

The thus obtained co-precipitated precursor, lithium carbonate particles, boric acid and magnesium fluoride were weighed and intimately mixed with each other. The resulting mixture was calcined at 950° C. for 10 hr under an air flow using an electric furnace, thereby obtaining positive electrode active substance particles.

Comparative Example 3

A closed type reaction vessel was charged with 14 L of water, and an inside of the reaction vessel was maintained at 50° C. while flowing a nitrogen gas therethrough. Further, a Ni-, Co- and Mn-sulfate mixed aqueous solution, an aqueous sodium carbonate solution and an aqueous ammonia solution were successively added into the reaction vessel while stirring such that the pH value therein was adjusted to 8.2 (±0.2). During the reaction, a filtrate only was discharged out of the reaction system using a concentration device, whereas a solid component separated from the filtrate was retained in the reaction vessel. After completion of the reaction, a slurry comprising a co-precipitated product was obtained. The thus obtained slurry was filtered, and the resulting solid was washed with water and dried at 100° C. overnight, thereby obtaining a co-precipitated precursor in the form of particles.

The thus obtained co-precipitated precursor and lithium carbonate particles were weighed and intimately mixed with each other. The resulting mixture was calcined at 850° C. for 5 hr under an air flow using an electric furnace.

The thus obtained calcined product and zinc fluoride were weighed and intimately mixed with each other. The resulting mixture was subjected to heat treatment at 400° C. for 3 hr under an air flow using an electric furnace, thereby obtaining positive electrode active substance particles.

Comparative Example 4

A closed type reaction vessel was charged with 14 L of water, and an inside of the reaction vessel was maintained at 40° C. while flowing a nitrogen gas therethrough. Further, a Ni-, Co- and Mn-sulfate mixed aqueous solution, an aqueous sodium hydroxide solution and an aqueous ammonia solution were successively added into the reaction vessel while stirring such that the pH value therein was adjusted to 11.2 (±0.2). During the reaction, a filtrate only was discharged out of the reaction system using a concentration device, whereas a solid component separated from the filtrate was retained in the reaction vessel. After completion of the reaction, a slurry comprising a co-precipitated product was obtained. The thus obtained slurry was filtered, and the resulting solid was washed with water and dried at 100° C. overnight, thereby obtaining a co-precipitated precursor in the form of particles.

The thus obtained co-precipitated precursor, lithium hydroxide particles and boric acid were weighed and intimately mixed with each other. The resulting mixture was calcined at 850° C. for 5 hr under an air flow using an electric furnace.

The thus obtained calcined product and titanium fluoride were weighed and intimately mixed with each other. The resulting mixture was subjected to heat treatment at 150° C. for 3 hr under an air flow using an electric furnace, thereby obtaining positive electrode active substance particles.

Comparative Example 5

A closed type reaction vessel was charged with 14 L of water, and an inside of the reaction vessel was maintained at 50° C. while flowing a nitrogen gas therethrough. Further, a Ni-, Co- and Mn-sulfate mixed aqueous solution and an aqueous sodium carbonate solution were successively added into the reaction vessel while stirring such that the pH value therein was adjusted to 8.5 (±0.2). During the reaction, a filtrate only was discharged out of the reaction system using a concentration device, whereas a solid component separated from the filtrate was retained in the reaction vessel. After completion of the reaction, a slurry comprising a co-precipitated product was obtained. The thus obtained slurry was filtered, and the resulting solid was washed with water and dried at 100° C. overnight, thereby obtaining a co-precipitated precursor in the form of particles.

The thus obtained co-precipitated precursor, lithium carbonate particles, boric acid and aluminum hydroxide were weighed and intimately mixed with each other. The resulting mixture was calcined at 830° C. for 10 hr under an air flow using an electric furnace, thereby obtaining positive electrode active substance particles.

Comparative Example 6

A closed type reaction vessel was charged with 14 L of water, and an inside of the reaction vessel was maintained at 40° C. while flowing a nitrogen gas therethrough. Further, a Ni-, Co- and Mn-sulfate mixed aqueous solution, an aqueous sodium hydroxide solution and an aqueous ammonia solution were successively added into the reaction vessel while stirring such that the pH value therein was adjusted to 11.4 (±0.2). During the reaction, a filtrate only was discharged out of the reaction system using a concentration device, whereas a solid component separated from the filtrate was retained in the reaction vessel. After completion of the reaction, a slurry comprising a co-precipitated product was obtained. The thus obtained slurry was filtered, and the resulting solid was washed with water and dried at 105° C. overnight, thereby obtaining a co-precipitated precursor in the form of particles.

The thus obtained co-precipitated precursor, lithium carbonate particles and boric acid were weighed and intimately mixed with each other. The resulting mixture was calcined at 810° C. for 5 hr under an air flow using an electric furnace.

Next, the resulting calcined product was charged into an aqueous aluminum nitrate solution, and while stirring at 15° C., an ammonium fluoride solution was added dropwise thereinto, followed by maintaining the resulting solution at 70° C. for 10 hr. The thus obtained slurry was filtered, and the resulting solid was dried at 105° C. overnight and then subjected to heat treatment at 500° C. for 3 hr under an air flow using an electric furnace, thereby obtaining positive electrode active substance particles.

Comparative Example 7

A closed type reaction vessel was charged with 14 L of water, and an inside of the reaction vessel was maintained at 60° C. while flowing a nitrogen gas therethrough. Further, a Ni-, Co- and Mn-sulfate mixed aqueous solution, an aqueous sodium carbonate solution and an aqueous ammonia solution were successively added into the reaction vessel while stirring such that the pH value therein was adjusted to 8.3 (±0.2). During the reaction, a filtrate only was discharged out of the reaction system using a concentration device, whereas a solid component separated from the filtrate was retained in the reaction vessel. After completion of the reaction, a slurry comprising a co-precipitated product was obtained. The thus obtained slurry was filtered, and the resulting solid was washed with water and dried at 100° C. overnight, thereby obtaining a co-precipitated precursor in the form of particles.

The thus obtained co-precipitated precursor, lithium hydroxide particles, boric acid and lithium fluoride were weighed and intimately mixed with each other. The resulting mixture was calcined at 880° C. for 7 hr under an air flow using an electric furnace, thereby obtaining positive electrode active substance particles.

Various properties of the positive electrode active substance particles obtained in Examples 1 to 29 and Comparative Examples 1 to 7 are shown in Table 1, and various properties of batteries produced using the positive electrode active substance particles are shown in Table 2.

TABLE 1

| Examples | B (wt %) | F (wt %) | Element A |  |
|---|---|---|---|---|
|  |  |  | A1 species | A1 (wt %) |
| Example 1 | 0.092 | 0.81 | Al | 0.384 |
| Example 2 | 0.211 | 1.25 | Al | 0.592 |
| Example 3 | 0.093 | 0.08 | Al | 0.040 |
| Example 4 | 0.142 | 0.07 | Al | 0.034 |
| Example 5 | 0.318 | 1.91 | Al | 0.905 |
| Example 6 | 0.012 | 0.02 | Al | 0.009 |
| Example 7 | 0.394 | 2.41 | Al | 1.646 |
| Example 8 | 0.669 | 3.62 | Al | 4.527 |
| Example 9 | 0.851 | 4.69 | Al | 6.945 |
| Example 10 | 0.211 | 1.27 | Mg | 0.782 |
| Example 11 | 0.091 | 0.83 | Mg | 0.397 |
| Example 12 | 0.203 | 1.26 | Ti | 0.569 |
| Example 13 | 0.088 | 0.84 | Ti | 0.378 |
| Example 14 | 3.207 | 1.24 | Zr | 0.591 |
| Example 15 | 0.099 | 0.74 | Cu | 0.780 |
| Example 16 | 0.186 | 1.02 | Fe | 0.999 |
| Example 17 | 0.063 | 0.81 | Zn | 1.394 |
| Example 18 | 0.179 | 1.25 | Mo | 1.052 |
| Example 19 | 0.157 | 0.69 | Bi | 2.530 |
| Example 20 | 0.231 | 0.50 | Al | 0.592 |
| Example 21 | 0.087 | 0.41 | Al | 0.384 |
| Example 22 | 0.207 | 0.75 | Al | 0.592 |
| Example 23 | 0.089 | 0.74 | Al | 0.384 |
| Example 24 | 0.221 | 0.90 | Al | 0.592 |
| Example 25 | 0.114 | 0.08 | Al | 0.057 |
| Example 26 | 0.137 | 4.31 | Al | 5.967 |
| Example 27 | 0.216 | 3.97 | Al | 7.465 |
| Example 28 | 0.021 | 0.27 | Al | 0.311 |
| Example 29 | 0.022 | 0.65 | Al | 0.326 |

TABLE 1-continued

| Examples | Element A |  |  |  |  |
|---|---|---|---|---|---|
|  | A2 species | A2 (wt %) | A3 species | A3 (wt %) | Element A (wt %) |
| Example 1 |  |  |  |  | 0.384 |
| Example 2 |  |  |  |  | 0.592 |
| Example 3 |  |  |  |  | 0.040 |
| Example 4 |  |  |  |  | 0.034 |
| Example 5 |  |  |  |  | 0.905 |
| Example 6 |  |  |  |  | 0.009 |
| Example 7 |  |  |  |  | 1.646 |
| Example 8 |  |  |  |  | 4.527 |
| Example 9 |  |  |  |  | 6.945 |
| Example 10 |  |  |  |  | 0.782 |
| Example 11 |  |  |  |  | 0.397 |
| Example 12 |  |  |  |  | 0.569 |
| Example 13 |  |  |  |  | 0.378 |
| Example 14 |  |  |  |  | 0.591 |
| Example 15 |  |  |  |  | 0.780 |
| Example 16 |  |  |  |  | 0.999 |
| Example 17 |  |  |  |  | 1.394 |
| Example 18 |  |  |  |  | 1.052 |
| Example 19 |  |  |  |  | 2.530 |
| Example 20 | Mg | 0.354 |  |  | 0.946 |
| Example 21 | Mg | 0.368 |  |  | 0.752 |
| Example 22 | Ti | 0.747 |  |  | 1.339 |
| Example 23 | Mg | 0.312 | Ti | 0.587 | 1.283 |
| Example 24 | Mg | 0.296 | Ti | 0.691 | 1.579 |
| Example 25 |  |  |  |  | 0.057 |
| Example 26 |  |  |  |  | 5.967 |
| Example 27 |  |  |  |  | 7.465 |
| Example 28 |  |  |  |  | 0.311 |
| Example 29 |  |  |  |  | 0.326 |

| Examples | Li/(Ni + Co + Mn) | 100×Ni/(Ni + Co + Mn) | 100×Co/(Ni + Co + Mn) | 100×Mn/(Ni + Co + Mn) |
|---|---|---|---|---|
| Example 1 | 1.3 | 21.6 | 12.4 | 66.0 |
| Example 2 | 1.5 | 19.2 | 10.7 | 70.0 |
| Example 3 | 1.4 | 21.6 | 12.5 | 66.0 |
| Example 4 | 1.3 | 21.6 | 12.4 | 66.0 |
| Example 5 | 1.3 | 21.7 | 10.6 | 67.6 |
| Example 6 | 1.2 | 37.0 | 6.2 | 56.8 |
| Example 7 | 1.2 | 2.7 | 39.0 | 58.2 |
| Example 8 | 1.6 | 30.4 | 6.5 | 63.1 |
| Example 9 | 1.7 | 2.9 | 33.7 | 63.3 |
| Example 10 | 1.5 | 19.4 | 10.9 | 69.7 |
| Example 11 | 1.3 | 21.8 | 12.3 | 65.9 |
| Example 12 | 1.5 | 19.2 | 10.7 | 70.0 |
| Example 13 | 1.3 | 21.4 | 12.6 | 66.0 |
| Example 14 | 1.5 | 19.5 | 10.5 | 70.0 |
| Example 15 | 1.3 | 21.6 | 12.4 | 66.0 |
| Example 16 | 1.5 | 19.2 | 10.7 | 70.1 |
| Example 17 | 1.3 | 21.5 | 12.3 | 66.2 |
| Example 18 | 1.5 | 19.4 | 10.7 | 69.9 |
| Example 19 | 1.3 | 21.6 | 12.2 | 66.2 |
| Example 20 | 1.5 | 19.2 | 10.7 | 70.0 |
| Example 21 | 1.3 | 21.8 | 12.4 | 65.8 |
| Example 22 | 1.5 | 19.4 | 10.9 | 69.7 |
| Example 23 | 1.3 | 21.7 | 12.4 | 65.9 |
| Example 24 | 1.5 | 19.2 | 10.7 | 70.0 |
| Example 25 | 1.4 | 6.3 | 8.5 | 85.1 |
| Example 26 | 1.4 | 0.0 | 30.5 | 69.5 |
| Example 27 | 1.5 | 21.4 | 0.0 | 78.6 |
| Example 28 | 1.4 | 21.6 | 12.4 | 66.0 |
| Example 29 | 1.5 | 19.2 | 10.7 | 70.1 |

| Examples | Peak intensity ratio (a)/(b) | BET specific surface area (m²/g) | Primary particle diameter (μm) | Secondary particle diameter (μm) |
|---|---|---|---|---|
| Example 1 | 0.071 | 3.5 | 0.07 | 12.1 |
| Example 2 | 0.043 | 3.0 | 0.18 | 4.3 |
| Example 3 | 0.045 | 2.3 | 0.16 | 14.8 |
| Example 4 | 0.055 | 3.7 | 0.07 | 5.1 |
| Example 5 | 0.039 | 6.7 | 0.12 | 11.7 |

TABLE 1-continued

| | | | | |
|---|---|---|---|---|
| Example 6 | 0.024 | 0.9 | 2.12 | 39.1 |
| Example 7 | 0.112 | 2.7 | 0.21 | 26.4 |
| Example 8 | 0.137 | 15.1 | 0.05 | 21.7 |
| Example 9 | 0.184 | 1.1 | 1.84 | 35.6 |
| Example 10 | 0.042 | 3.5 | 0.23 | 5.2 |
| Example 11 | 0.034 | 4.2 | 0.17 | 10.3 |
| Example 12 | 0.044 | 3.3 | 0.25 | 4.8 |
| Example 13 | 0.029 | 4.3 | 0.19 | 14.3 |
| Example 14 | 0.043 | 3.4 | 0.20 | 4.6 |
| Example 15 | 0.037 | 3.8 | 0.17 | 16.1 |
| Example 16 | 0.044 | 3.1 | 0.26 | 5.6 |
| Example 17 | 0.031 | 3.9 | 0.27 | 12.4 |
| Example 18 | 0.045 | 2.9 | 0.24 | 4.7 |
| Example 19 | 0.035 | 3.4 | 0.23 | 11.6 |
| Example 20 | 0.041 | 3.2 | 0.26 | 6.1 |
| Example 21 | 0.033 | 3.9 | 0.16 | 13.7 |
| Example 22 | 0.042 | 2.7 | 0.31 | 3.9 |
| Example 23 | 0.031 | 4.2 | 0.16 | 9.2 |
| Example 24 | 0.040 | 2.8 | 0.25 | 4.2 |
| Example 25 | 0.068 | 1.7 | 0.49 | 15.1 |
| Example 26 | 0.055 | 2.3 | 0.28 | 14.2 |
| Example 27 | 0.080 | 2.6 | 0.26 | 18.3 |
| Example 28 | 0.069 | 3.4 | 0.07 | 12.0 |
| Example 29 | 0.044 | 3.1 | 0.17 | 3.9 |

| Comparative Examples | B (wt %) | F (wt %) | Element A A1 species | Element A A1 (wt %) |
|---|---|---|---|---|
| Comparative Example 1 | 0.091 | 0.04 | Al | 0.021 |
| Comparative Example 2 | 1.634 | 1.27 | Mg | 0.787 |
| Comparative Example 3 | 0.000 | 0.81 | Zn | 1.401 |
| Comparative Example 4 | 0.087 | 7.26 | Ti | 3.240 |
| Comparative Example 5 | 0.134 | 0.00 | Al | 0.012 |
| Comparative Example 6 | 0.246 | 2.31 | Al | 14.135 |
| Comparative Example 7 | 0.097 | 0.35 | — | 0.000 |

| Comparative Examples | Element A A2 species | Element A A2 (wt %) | Element A A3 species | Element A A3 (wt %) | Element A (wt %) |
|---|---|---|---|---|---|
| Comparative Example 1 | | | | | 0.021 |
| Comparative Example 2 | | | | | 0.787 |
| Comparative Example 3 | | | | | 1.401 |
| Comparative Example 4 | | | | | 3.240 |
| Comparative Example 5 | | | | | 0.012 |
| Comparative Example 6 | | | | | 14.135 |
| Comparative Example 7 | | | | | 0.000 |

| Comparative Examples | Li/(Ni + Co + Mn) | 100×Ni/(Ni + Co + Mn) | 100×Co/(Ni + Co + Mn) | 100×Mn/(Ni + Co + Mn) |
|---|---|---|---|---|
| Comparative Example 1 | 1.0 | 22.2 | 12.8 | 65.0 |
| Comparative Example 2 | 1.4 | 21.5 | 11.0 | 67.5 |
| Comparative Example 3 | 1.3 | 21.5 | 12.3 | 66.2 |
| Comparative Example 4 | 1.4 | 21.3 | 10.7 | 67.9 |
| Comparative Example 5 | 1.4 | 21.5 | 12.2 | 66.4 |
| Comparative Example 6 | 1.3 | 18.9 | 7.3 | 73.9 |
| Comparative Example 7 | 1.4 | 20.6 | 14.4 | 64.9 |

| Comparative Examples | Peak intensity ratio (a)/(b) | BET specific surface area (m²/g) | Primary particle diameter (μm) | Secondary particle diameter (μm) |
|---|---|---|---|---|
| Comparative Example 1 | 0.012 | 3.4 | 0.05 | 10.4 |
| Comparative Example 2 | 0.041 | 0.1 | 3.61 | 16.0 |
| Comparative Example 3 | 0.038 | 2.1 | 0.12 | 12.2 |
| Comparative Example 4 | 0.040 | 3.4 | 0.24 | 4.7 |
| Comparative Example 5 | 0.041 | 4.0 | 0.19 | 11.6 |
| Comparative Example 6 | 0.039 | 4.3 | 0.18 | 5.9 |
| Comparative Example 7 | 0.042 | 3.6 | 0.23 | 16.7 |

TABLE 2

| | DSC heat generation initiation temp. (° C.) | 3rd Cycle discharge capacity (mAh/g) | 32nd Cycle discharge capacity (mAh/g) | 32nd Cycle discharge capacity/3rd cycle discharge capacity (%) |
|---|---|---|---|---|
| Examples | | | | |
| Example 1 | 246 | 237 | 236 | 99.6 |
| Example 2 | 244 | 238 | 236 | 99.2 |
| Example 3 | 244 | 237 | 235 | 99.2 |
| Example 4 | 243 | 236 | 233 | 98.7 |
| Example 5 | 243 | 234 | 233 | 99.6 |
| Example 6 | 233 | 224 | 218 | 97.3 |
| Example 7 | 232 | 226 | 218 | 96.5 |
| Example 8 | 224 | 214 | 200 | 93.5 |
| Example 9 | 217 | 197 | 174 | 88.3 |
| Example 10 | 242 | 237 | 235 | 99.2 |
| Example 11 | 243 | 235 | 233 | 99.1 |
| Example 12 | 241 | 236 | 234 | 99.2 |
| Example 13 | 242 | 237 | 235 | 99.2 |
| Example 14 | 240 | 231 | 229 | 99.1 |
| Example 15 | 241 | 232 | 230 | 99.1 |
| Example 16 | 238 | 234 | 232 | 99.1 |
| Example 17 | 243 | 237 | 235 | 99.2 |
| Example 18 | 237 | 231 | 229 | 99.1 |
| Example 19 | 239 | 232 | 230 | 99.1 |
| Example 20 | 241 | 241 | 239 | 99.2 |
| Example 21 | 242 | 242 | 240 | 99.2 |
| Example 22 | 243 | 242 | 240 | 99.2 |
| Example 23 | 241 | 243 | 241 | 99.2 |
| Example 24 | 244 | 244 | 242 | 99.2 |
| Example 25 | 231 | 208 | 205 | 98.6 |
| Example 26 | 239 | 207 | 204 | 98.6 |
| Example 27 | 227 | 216 | 212 | 98.1 |
| Example 28 | 245 | 252 | 251 | 99.6 |
| Example 29 | 244 | 250 | 249 | 99.6 |
| Comparative Examples | | | | |
| Comparative Example 1 | 226 | 161 | 124 | 77.0 |
| Comparative Example 2 | 209 | 92 | 71 | 77.2 |
| Comparative Example 3 | 211 | 234 | 175 | 74.8 |

TABLE 2-continued

|  | DSC heat generation initiation temp. (° C.) | 3rd Cycle discharge capacity (mAh/g) | 32nd Cycle discharge capacity (mAh/g) | 32nd Cycle discharge capacity/ 3rd cycle discharge capacity (%) |
|---|---|---|---|---|
| Comparative Example 4 | 207 | 174 | 123 | 70.7 |
| Comparative Example 5 | 198 | 215 | 130 | 60.5 |
| Comparative Example 6 | 207 | 169 | 129 | 76.3 |
| Comparative Example 7 | 200 | 224 | 126 | 56.3 |

In any of the positive electrode active substance particles obtained in Examples 1 to 29, the 3rd cycle discharge capacity thereof was not less than 190 mA/g, and the ratio in percent of the 32nd cycle discharge capacity to the 3rd cycle discharge capacity was not less than 85%. Thus, it was confirmed that the positive electrode active substance particles obtained according to the present invention had a large discharge capacity owing to the presence of the crystal structure belonging to a space group of 2C/m, and further the reaction thereof with an electrolyte solution upon charging and discharging and upon heating was suppressed owing to the boron, fluorine and element A added thereto. Therefore, the positive electrode active substance particles according to the present were positive electrode materials having a high discharge capacity as well as excellent cycle characteristics and thermal stability.

On the other hand, the positive electrode active substance particles obtained in Comparative Examples which failed to comprise boron, fluorine and the element A in an adequate amount were deteriorated in thermal stability and/or cycle characteristics as compared those obtained in Examples. However, it was recognized that if boron, fluorine and the element A were allowed to coexist in an adequate amount in the positive electrode active substance particles, it was possible to obtain positive electrode active substance particles for non-aqueous electrolyte secondary batteries having a high discharge capacity as well as excellent thermal stability and cycle characteristics.

From the above results, it was confirmed that the positive electrode active substance particles according to the present invention exhibited large charge/discharge capacities as well as excellent cycle characteristics and thermal stability, and therefore were useful as a positive electrode active substance particles for non-aqueous electrolyte secondary batteries.

INDUSTRIAL APPLICABILITY

The positive electrode active substance particles according to the present invention have large charge/discharge capacities as well as excellent cycle characteristics and thermal stability, and therefore can be suitably used as a positive electrode active substance particles for non-aqueous electrolyte secondary batteries.

The invention claimed is:

1. A positive electrode active substance particles comprising a compound having at least a crystal system belonging to a space group of R-3m and a crystal system belonging to a space group of C2/m, the compound comprising
   a composite oxide comprising at least Li, Mn, and Co and/or Ni, an element A, wherein A is at least one element selected from the group consisting of Al, Mg, Ti, Zr, Ca, Fe, Zn, Mo and Bi, boron and fluorine, in which
   a molar ratio of Mn to a sum of Ni, Co and Mn [Mn/(Ni+Co+Mn)] therein is not less than 0.56;
   a content of the boron in the compound is 0.01 to 1% by weight;
   a content of the fluorine in the compound is 0.01 to 5% by weight;
   a content of the element A in the compound is 0.004 to 9% by weight; and
   a relative intensity ratio [(a)/(b)] of a maximum diffraction peak intensity (a) observed at 2θ=20.8±1° in a powder X-ray diffraction pattern of the positive electrode active substance particles as measured using a Cu-Ka ray to a maximum diffraction peak intensity (b) observed at 2θ=18.6±1° in the powder X-ray diffraction pattern [(a)/(b)] is 0.02 to 0.2,
   wherein the positive electrode active substance particles have a molar ratio of Li/(Ni+Co+Mn) of 1.4 to 1.7.

2. The positive electrode active substance particles according to claim 1, wherein the crystal system belonging to a space group of R-3m includes compounds comprising $LiM_xMn_{1-x}O_2$ wherein M is Ni and/or Co; 0<x≤1, and the crystal system belonging to a space group of C2/m includes compounds comprising $Li_2M'_{(1-y)}Mn_yO_3$ wherein M' is Ni and/or Co; 0<y≤1.

3. The positive electrode active substance particles according to claim 1, wherein the positive electrode active substance particles have a specific surface area of 0.05 to 20 $m^2/g$ as measured by a BET method.

4. The positive electrode active substance particles according to claim 1, wherein
   the positive electrode active substance particles are in the form of secondary particles produced by aggregating primary particles thereof in which the primary particles have an average primary particle diameter of not more than 5 μm,
   the secondary particles have an average secondary particle diameter of 1 to 50 μm, and
   the secondary particles have average particle diameters greater than the primary particles.

5. A process for producing the positive electrode active substance particles as defined in claim 1, comprising any of a step (1) of dry-mixing precursor particles comprising a transition metal, a boron compound, a lithium compound, a fluorine compound and a compound of the element A and then calcining the resulting mixture; a step (2) of wet-mixing a slurry or the like of the precursor particles comprising a transition metal with the boron compound, the fluorine compound and the compound of the element A, drying the obtained wet mixture to obtain dry particles, mixing the dry particles with the lithium compound, and then calcining the resulting mixture; and a step (3) of dry-mixing or wet-mixing the precursor particles comprising a transition metal with the boron compound and the lithium compound, calcining particles of the obtained dry or wet mixture, dry-mixing or wet-mixing the calcined product with the fluorine compound and the compound of the element A, and subjecting particles of the resulting mixture to heat treatment.

6. A non-aqueous electrolyte secondary battery comprising a positive electrode comprising the positive electrode active substance particles as defined in claim 1.

7. A positive electrode active substance particles comprising a compound having at least a crystal system belonging to a space group of R-3m and a crystal system belonging to a space group of C2/m, the compound comprising a composite oxide comprising at least Li, Mn, and Co and/or Ni, an element A, wherein A is at least one element selected from the group consisting of Al, Mg, Ti, Zr, Ca, Fe, Zn, Mo and Bi, boron and fluorine, in which a molar ratio of Mn to a sum of Ni, Co and Mn [Mn/(Ni+Co+Mn)] therein is not less than 0.6;

a content of the boron in the compound is 0.01 to 1% by weight;

a content of the fluorine in the compound is 0.01 to 5% by weight;

a content of the element A in the compound is 0.004 to 9% by weight; and a relative intensity ratio [(a)/(b)] of a maximum diffraction peak intensity (a) observed at $2\theta=20.8\pm1°$ in a powder X-ray diffraction pattern of the positive electrode active substance particles as measured using a Cu-Ka ray to a maximum diffraction peak intensity (b) observed at $2\theta=18.6\pm1°$ in the powder X-ray diffraction pattern [(a)/(b)] is 0.02 to 0.2.

8. The positive electrode active substance particles according to claim 7, wherein the crystal system belonging to a space group of R-3m includes compounds comprising $LiM_xMn_{1-x}O_2$ wherein M is Ni and/or Co; $0<x\leq1$, and the crystal system belonging to a space group of C2/m includes compounds comprising $Li_2M'_{(1-y)}Mn_yO_3$ wherein M' is Ni and/or Co; $0<y\leq1$.

9. The positive electrode active substance particles according to claim 7, wherein the positive electrode active substance particles have a molar ratio of Li/(Ni+Co+Mn) of 1.2 to 1.7.

10. The positive electrode active substance particles according to claim 7, wherein the positive electrode active substance particles have a specific surface area of 2.3 to 20 $m^2/g$ as measured by a BET method.

11. The positive electrode active substance particles according to claim 7, wherein the positive electrode active substance particles are in the form of secondary particles produced by aggregating primary particles thereof in which the primary particles have an average primary particle diameter of not more than 5 μm, the secondary particles have an average secondary particle diameter of 3 to 50 μm, and the secondary particles have average particle diameters greater than the primary particles.

12. A positive electrode active substance particles comprising a compound having at least a crystal system belonging to a space group of R-3m and a crystal system belonging to a space group of C2/m, the compound comprising a composite oxide comprising at least Li, Mn, and Co and/or Ni, an element A, wherein A is at least one element selected from the group consisting of Al, Mg, Ti, Zr, Ca, Fe, Zn, Mo and Bi, boron and fluorine, in which a molar ratio of Mn to a sum of Ni, Co and Mn [Mn/(Ni+Co+Mn)] therein is not less than 0.568;

a content of the boron in the compound is 0.01 to 1% by weight;

a content of the fluorine in the compound is 0.01 to 5% by weight;

a content of the element A in the compound is 0.004 to 9% by weight; and a relative intensity ratio [(a)/(b)] of a maximum diffraction peak intensity (a) observed at $2\theta=20.8\pm1°$ in a powder X-ray diffraction pattern of the positive electrode active substance particles as measured using a Cu-Ka ray to a maximum diffraction peak intensity (b) observed at $2\theta=18.6\pm1°$ in the powder X-ray diffraction pattern [(a)/(b)] is 0.02 to 0.2.

13. The positive electrode active substance particles according to claim 12, wherein the molar ratio of Mn to a sum of Ni, Co and Mn [Mn/(Ni+Co+Mn)] therein is not less than 0.582.

14. The positive electrode active substance particles according to claim 12, wherein the crystal system belonging to a space group of R-3m includes compounds comprising $LiM_xMn_{1-x}O_2$ wherein M is Ni and/or Co; $0<x\leq1$, and the crystal system belonging to a space group of C2/m includes compounds comprising $Li_2M'_{(1-y)}Mn_yO_3$ wherein M' is Ni and/or Co; $0<y\leq1$.

15. The positive electrode active substance particles according to claim 12, wherein the positive electrode active substance particles have a molar ratio of Li/(Ni+Co+Mn) of 1.2 to 1.7.

16. The positive electrode active substance particles according to claim 12, wherein the positive electrode active substance particles have a specific surface area of 2.3 to 20 $m^2/g$ as measured by a BET method.

17. The positive electrode active substance particles according to claim 12, wherein the positive electrode active substance particles are in the form of secondary particles produced by aggregating primary particles thereof in which the primary particles have an average primary particle diameter of not more than 5 μm, the secondary particles have an average secondary particle diameter of 3 to 50 μm, and the secondary particles have average particle diameters greater than the primary particles.

\* \* \* \* \*